US012579415B2

(12) United States Patent
Boyd et al.

(10) Patent No.: US 12,579,415 B2
(45) Date of Patent: Mar. 17, 2026

(54) AREA-EFFICIENT CONVOLUTIONAL BLOCK

(71) Applicant: Intel Corporation, Santa Clara, CA (US)

(72) Inventors: Richard Boyd, Ballynahinch (IE); Vasile Toma-Ii, Timis (RO); Luca Puglia, Dublin (IE); Zsolt Biro, Harghita (RO)

(73) Assignee: Intel Corporation, Santa Clara, CA (US)

( * ) Notice: Subject to any disclaimer, the term of this patent is extended or adjusted under 35 U.S.C. 154(b) by 1067 days.

(21) Appl. No.: 17/542,835

(22) Filed: Dec. 6, 2021

(65) Prior Publication Data
US 2022/0092399 A1 Mar. 24, 2022

(51) Int. Cl.
| | |
|---|---|
| *G06F 17/10* | (2006.01) |
| *G06F 5/01* | (2006.01) |
| *G06F 7/50* | (2006.01) |
| *G06F 7/523* | (2006.01) |
| *G06F 7/544* | (2006.01) |
| *G06F 9/50* | (2006.01) |
| *G06N 3/063* | (2023.01) |

(52) U.S. Cl.
CPC ............... *G06N 3/063* (2013.01); *G06F 5/01* (2013.01); *G06F 7/50* (2013.01); *G06F 7/523* (2013.01); *G06F 7/5443* (2013.01); *G06F 9/5027* (2013.01)

(58) Field of Classification Search
CPC .................................. G06N 3/063; G06F 5/01
See application file for complete search history.

(56) References Cited

U.S. PATENT DOCUMENTS

| | | | | | |
|---|---|---|---|---|---|
| 5,508,948 | A | * | 4/1996 | Hatta ...................... | G06F 17/10 |
| | | | | | 708/204 |
| 6,965,908 | B2 | * | 11/2005 | Shaw .................... | G06F 7/5443 |
| | | | | | 708/603 |

(Continued)

OTHER PUBLICATIONS

Charles R. Baugh, A Two's Complement Parallel Array Multiplication Algorithm, 1973, IEEE Transaction on Computers, vol. C-22, pp. 1045-1047. (Year: 1973).*

(Continued)

*Primary Examiner* — Cheng Yuan Tseng
(74) *Attorney, Agent, or Firm* — Akona IP PC

(57) ABSTRACT

Hardware accelerator designs for neural networks are improved with various approaches to reduce circuit area, improve power consumption, and reduce starvation. Convolutional layers of a neural network may multiply a set of weights with a set of inputs. One example defers two's complement arithmetic from the parallelized multiplication circuits and completes the two's complement arithmetic when the results are accumulated. In another example, a multiplication circuit initially multiplies an input by an initial value of the maximum (or minimum) multiplication range before applying the magnitude of a multiplication encoded relative to the multiplication range. In another example, after dimensional reduction earlier in the network hardware, circuitry for a convolutional layer uses a reduced number of convolutional block circuits that are reused across a plurality of clock cycles to apply different subsets of weight channels.

25 Claims, 12 Drawing Sheets

(56)  References Cited

U.S. PATENT DOCUMENTS

| | | | | |
|---|---|---|---|---|
| 7,315,163 | B2 * | 1/2008 | Takeuchi | G06F 7/5332 |
| | | | | 708/625 |
| 11,960,565 | B2 * | 4/2024 | Shibata | G06N 3/04 |
| 12,154,026 | B2 * | 11/2024 | Lu | G06F 9/5027 |
| 2005/0223054 | A1 * | 10/2005 | Lo | G06F 7/5336 |
| | | | | 708/625 |
| 2014/0101214 | A1 * | 4/2014 | Kroener | G06F 17/10 |
| | | | | 708/650 |
| 2021/0182077 | A1 * | 6/2021 | Chen | G06Q 30/0241 |
| 2022/0092399 | A1 * | 3/2022 | Boyd | G06F 9/5027 |

OTHER PUBLICATIONS

Hyuk Park, Truncated Multiplications for the Negative Two's Complement Number System. 2006, IEEE, pp. 428-432. (Year: 2006).*

Ranjan Kumar Barik, Efficient Hardware Realization of Signed Arithmetic Operation Using IEN, 2015, IEEE, pp. 1-5. (Year: 2015).*

"Intel uses artificial intelligence to create anti-poaching camera", The Irish News Magazine Section, Jan. 3, 2019, retrieved from https://www.irishnews.com/magazine/technology/2019/01/03/news/intel-uses-artificial-intelligence-to-create-anti-poaching-camera-1520510/ on Oct. 1, 2021, 5 pages.

"Nvidia Tesla V100 GPU Accelerator Data Sheet", Tesla V100/Data Sheet/Jul. 2017, retrieved from https://images.nvidia.com/content/technologies/volta/pdf/437317-Volta-V100-DS-NV-US-WEB.pdf, 2 pages.

Choi, Jungwook et al "PACT: Parameterized Clipping Activation for Quantized Neural Networks", ArXiv abs/1805.06085 (2018): 15 pages.

Li, Yuhang et al "Additive Powers-of-Two Quantization: An Efficient Non-Uniform Discretization for Neural Networks", ArXiv abs/1909.13144 (2019): 15 pages.

Saha, Sumit, "A Comprehensive Guide to Convolutional Neural Networks—the ELI5 way", www.towardsdatascience.com, retrieved from https://towardsdatascience.com/a-comprehensive-guide-to-convolutional-neural-networks-the-eli5-way-3bd2b1164a53 on Jan. 10, 2021, 12 pages.

Whatmough, Paul N. et al., "FixyNN: Efficient Hardware for Mobile Computer Vision via Transfer Learning", ArXiv abs/1902.11128 (2019) 13 pages.

* cited by examiner

Convolutional Layer with
Rotating Weights in
Convolutional Blocks

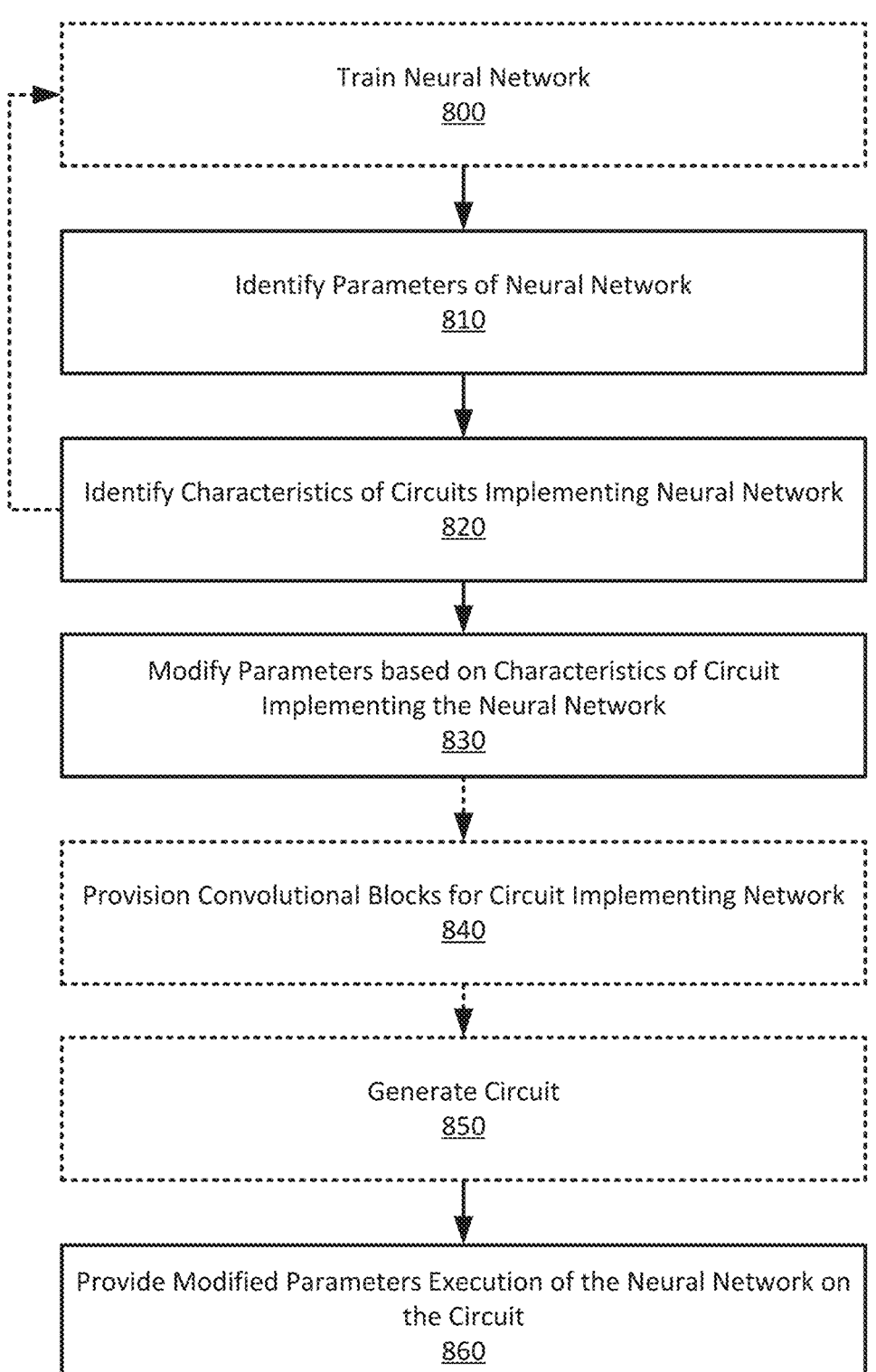

Train Neural Network
800

Identify Parameters of Neural Network
810

Identify Characteristics of Circuits Implementing Neural Network
820

Modify Parameters based on Characteristics of Circuit Implementing the Neural Network
830

Provision Convolutional Blocks for Circuit Implementing Network
840

Generate Circuit
850

Provide Modified Parameters Execution of the Neural Network on the Circuit
860

FIG. 8

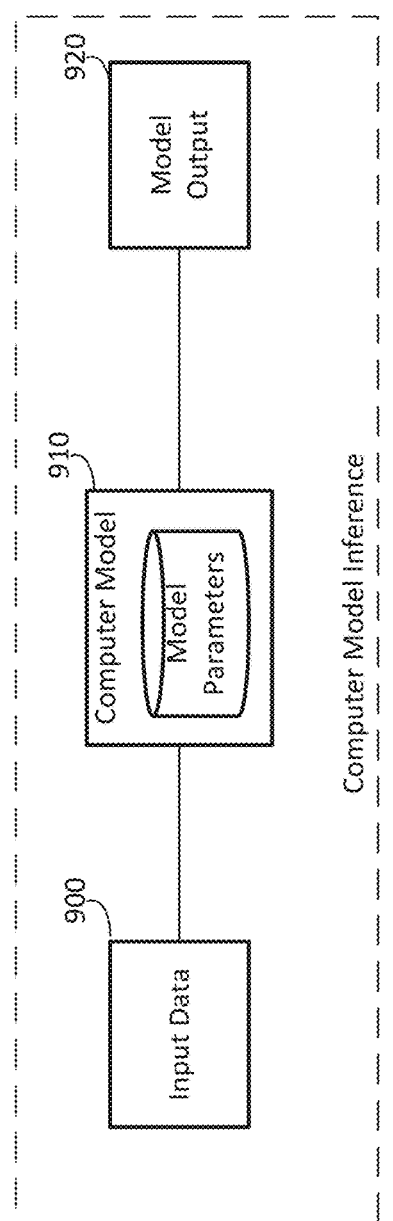
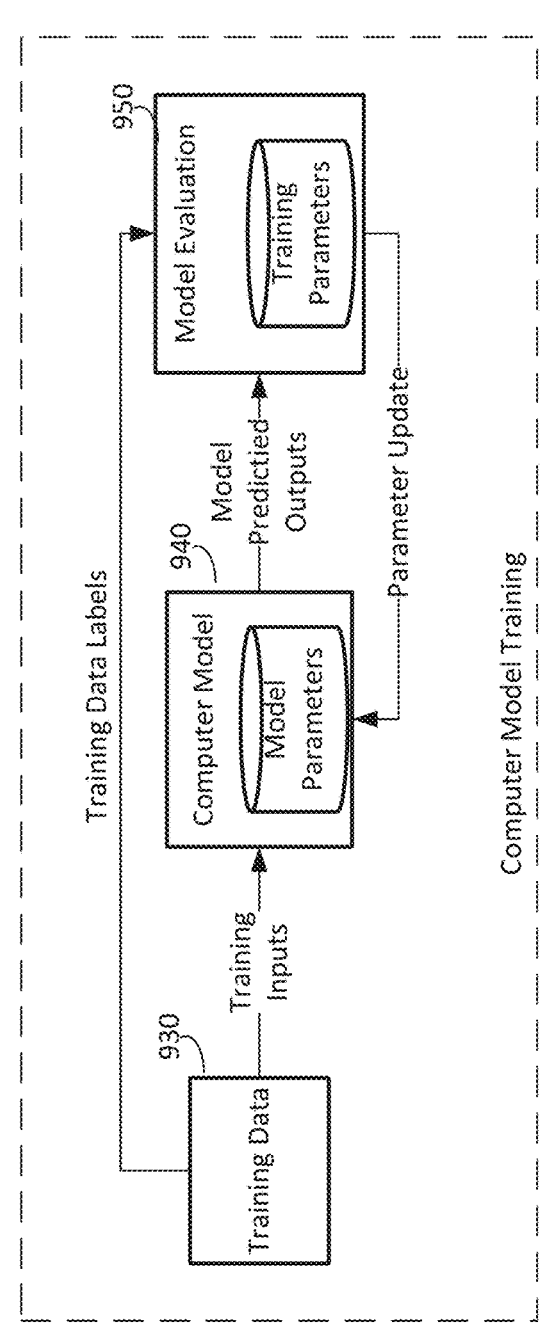
FIG. 9

Output Layer
1030

Hidden Layer(s)
1020

Input Layer
1010

AREA-EFFICIENT CONVOLUTIONAL BLOCK

TECHNICAL FIELD

This disclosure relates generally to computer modeling and neural networks, and particularly to improving neural network implementations.

BACKGROUND

Over time, increasingly complex neural network applications, such as computer vision, yield increasingly complex demands on hardware implementing such neural networks. Neural networks can achieve high accuracy, but often require a high amount of compute, which may be difficult for even general-purpose neural network accelerators to effectively provide.

One type of computation used in these networks is a convolutional block. A convolution includes the sum of products of two input sets, after which, in a typical neural network, additional operations may be performed such as an activation function (e.g., ReLU). In accelerators, these convolutional blocks may be implemented in a large parallel structure to perform the multiplication of the input sets and subsequent sum, which can demand a large area to implement in circuitry.

In addition, in neural network hardware implementations, such as dedicated hardware accelerators, there may be a number of layers that are capable of processing one "input" (e.g., an image or a portion of an image in a computer vision application) at a time (e.g., in one clock cycle). For example, an input layer may receive a 1×1, 2×2, 3×3, 4×4, 5×5, or larger portion of an image, typically described by three color channels, and the initial processing layer may generate a complete set of output channels for that input in one clock cycle. However, networks often include one or more dimensionality reduction layers which receive and process more than one of these inputs at a time. After the reduction, in typical fixed-function hardware accelerators (e.g., with hard-coded layer architectures) the resulting data after the dimensional reduction is thus typically not updated as frequently as the upstream layers, which can cause downstream layers to starve and be inefficiently used, reducing throughput and operational time. In particular, this can occur in architectures in which separate fixed hardware is provisioned for upstream as well as downstream processing layers. As a result, typical downstream layers may be inefficiently utilized.

There is thus a need to reduce the area requirements of such convolutional blocks for fixed-architecture accelerators, and to improve the downstream processing of neural networks and reduce circuit downtime.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 shows an example flowchart for optimizing a neural network for implementation in specialized hardware as disclosed herein, according to one embodiment.

FIG. 9 shows example computer model inference and computer model training.

DETAILED DESCRIPTION

Overview

Figure 1:
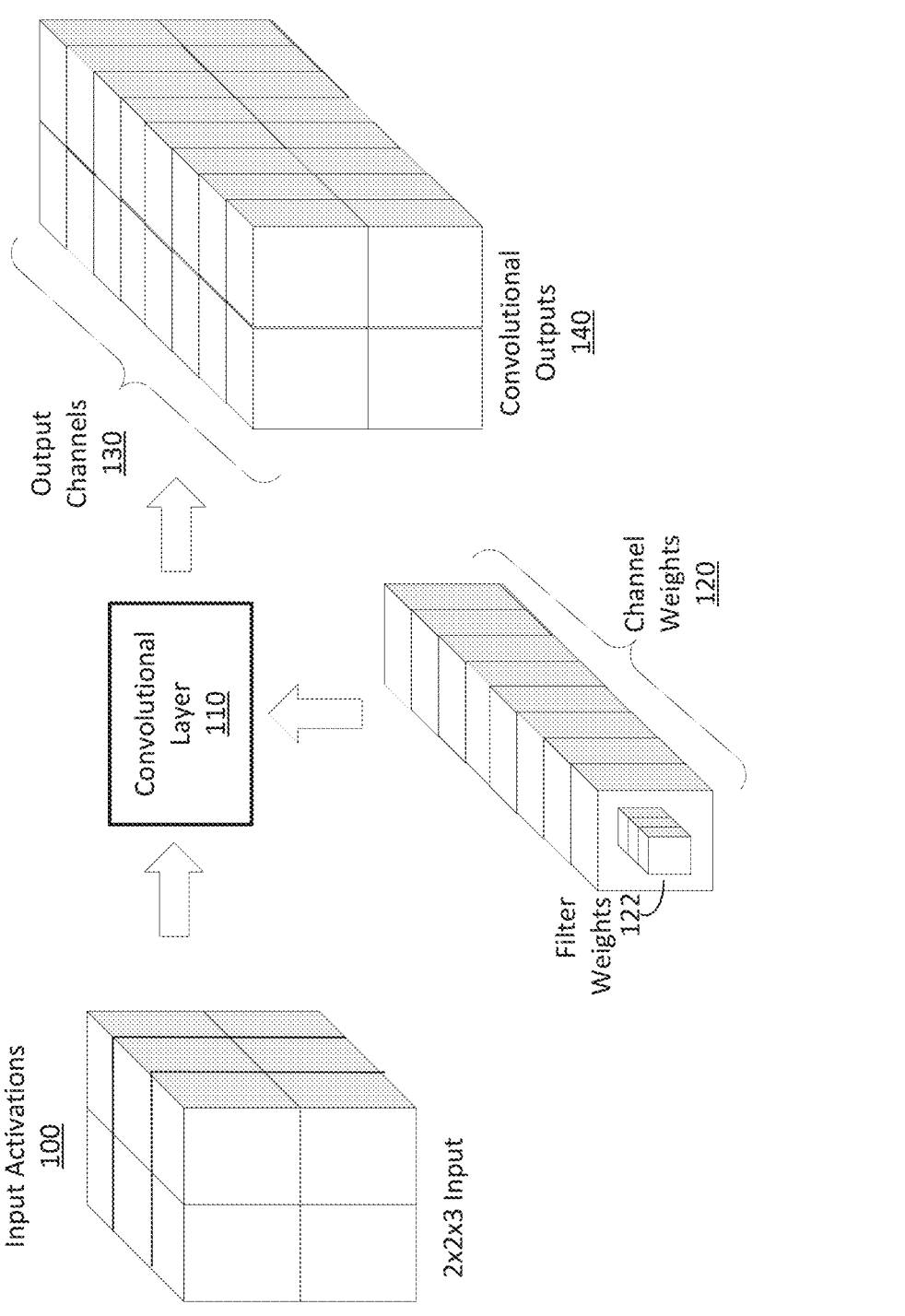
FIG. 1 is an example of a convolutional layer in a neural network according to one embodiment.

Described herein are approaches for implementing neutral networks in circuitry which reduces computational area and improves re-use of convolutional blocks after a dimensional reduction of a neural network.

Disclosed herein is improved circuitry for implementing multiply-and-accumulate (MAC) circuits often used for convolutional blocks that implement convolutional layers of a neural network. The MAC circuit multiplies an input activation by a respective weight using a pseudo-multiplication circuit. When a number is multiplied by a negative in two's complement arithmetic, the number is inverted and then a "one" is added. Rather than completing the two's complement arithmetic within the multiplication circuit, a pseudo-multiplication circuit performs the multiplication of the number with the weight and applies the inversion of a negative weight without completing the two's complement arithmetic. Instead, for each negative weight applied in the circuit, the two's complement arithmetic is completed when the multiplied results are accumulated. In one embodiment, the MAC circuit includes an addition for a "bias" parameter, which is modified to account for the completion of the two's complement arithmetic. The modification of the bias parameter may be performed by the software designing the network, allowing the bias to account for the pseudo-multiplication circuits by increasing the bias based on the number of negative weights in the convolutional block, thus allowing the bias parameter to be co-designed with the circuit architecture in mind and to perfect the two's complement for negative weights.

In additional embodiments, the pseudo-multiplication circuits apply perform multiplication by bit-shifting the input activation, further reducing the area requirements without significantly limiting model accuracy. In various embodiments, the weight values may be encoded to define a magnitude of shift relative to a maximum (or minimum) weight range of the pseudo-multiplication circuit. To implement the bitshift, the circuit may include an initial bitshift of the input activation to the maximum (or minimum) range of the pseudo-multiplication circuit and subsequently apply a bitshift of the encoded weight magnitude. The weights may also be encoded with a negative bit and a zero bit.

In additional embodiments, a convolutional block reduces starvation after a dimensional reduction. A convolutional layer applies a set of channel weights to a set of input activations to generate a set of layer outputs. The convolutional block circuitry is configurable and applies a subset of the set of channel weights to the input activations to generate a current channel output stored in a channel buffer. In each clock cycle, a subset of the channel weights is selected and applied by the convolutional block circuitry and thus the convolutions "rotate" through the full set of channel weights over a plurality of clock cycles, enabling re-use of the convolutional block circuitry. After all of the weight subsets are rotated through (e.g., at the end of the plurality of clock cycles), the channel buffer can output the layer outputs. In further embodiments, the convolutional blocks are provisioned such that the number of convolutional blocks and the plurality of clock cycles are a function of prior dimensional reduction in the network. For example, when the dimensions of the network are reduced by N, the resulting input to the convolutional layer after the dimensional reduction may thus change only every N clock cycles, permitting the convolutional blocks in the convolutional layer to be provisioned such that the number of convolutional blocks is the number of channel weights (e.g., channels for the channel) divided by N.

By reducing the area for MAC circuits in the convolutional layer and re-using convolutional blocks and reducing starvation of circuitry after dimensional reduction, the required size and efficacy of hardware acceleration for neural networks can be dramatically approved. In addition, these approaches may represent effective means for software-hardware co-design of neural networks. In training the network or in preparing the trained network for implementation in a particular circuit—the software may be "aware" of the hardware design and thus determine weight values for the MAC circuit (e.g., the bias or encoded weight values) that successfully permit optimization of parallel pseudo-multiply circuits and provision of fewer convolutional blocks after dimensional reduction using rotating weights to optimize channel convolutions.

For purposes of explanation, specific numbers, materials, and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. The meaning of "a," "an," and "the" include plural references. The meaning of "in" includes "in" and "on."

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. The terms "substantially," "close," "approximately," "near," and "about," generally refer to being within +/−20% of a target value. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

Convolutional Block with Deferred Two's Complement Arithmetic

FIG. 1 is an example of a convolutional layer in a neural network according to one embodiment. As discussed below with respect to FIGS. 9-10, computer models typically include parameters that are used to process inputs to predict outputs. Such computer models may be iteratively trained to learn parameters, including weights, for predicting various outputs based on input data. As discussed further in FIG. 10, individual layers in a neural network may receive input activations and process the input activations to generate output activations of the layer. FIG. 1 is an example of a convolutional layer 110 in which a set of channel weights 120 are applied to input activations 100 to generate a set of convolutional outputs 140.

In a convolutional layer 110, the channel weights may be applied to the input activations 100 to generate additional (or fewer) features in the form of "channels" of data. The output for each channel may be generated by applying a convolutional kernel, sometimes also termed a convolutional filter, to the input activations. Typically, the convolutional kernel comprises a matrix of weights indicating the respective contribution of each respective input value in the input activation matrix to the resulting output activation. In the example shown in FIG. 1, the input activations 100 to the convolutional layer 110 is a 2×2×3 matrix. This may represent, for example, an input layer to the neural network that receives a two-pixel by two-pixel portion of an image, where each pixel includes 3 values describing the red, green, and blue intensity of the pixel. For the input image, the three color values in red-green-blue color space are thus three separate channels of information for each pixel in the input activations 100. For simplicity, in this example the convolutional layer applies a 1×1 filter size to generate eight output channels 130. In this example, the convolutional layer 110 applies a set of channel weights 120 to each of the pixels to generate the output channels 130 for each of the pixels and form a 2×2×8 matrix of convolutional outputs. The input activations for each output channel of a pixel thus includes the three channels for the respective pixel.

In various implementations, the input activations and the weights may have a specific size, in bits, in the network. For example, the input activations (and likewise, the output activations for a corresponding prior layer) may be 4, 8, or 16 bits in width and similarly the weights may be represented by a suitable number of bits such as 4, 8, 16, etc. As discussed further below, the number of bits used to represent activations and weights may themselves be trained aspects of the neural network. The architecture as discussed herein also provides for additional accuracy and reduced area, permitting fewer bits (and thus reduced circuitry) to effectively represent a layer in the network.

The filter weights 122 for a channel includes a weight for each input activation processed by the convolutional layer. As shown in FIG. 1, the filter weights 122 for each channel are a 1×1×3 matrix, corresponding to the 1×1 filter and the three channels of the input activation 100. To perform the convolution for the convolutional layer 110, then, each output channel 130 is determined by applying the respective input activations 100 to the filter weights 122 for the channel. The set of channel weights 120 typically includes a set of filter weights 122 for each of the filters applied to the input activations 100 (and each yielding a channel in the output channels 130). To complete the computation for the convolutional layer 110, the set of filter weights for the channel is applied (for a 1×1 filter) to each of the pixels in the input activations 100. After multiplying the input activations 100 with the respective filter weights 122, the results are accumulated and each filter may include additional parameters or processing to normalize or further process the input activations before yielding the respective output channel. Even in this relatively simple example, to yield the 2×2×8 set of convolutional outputs, three filter weights are multiplied by three input activations before accumulation and further processing, yielding ninety-six (2×2×8×3) potential multiplication operations to generate the convolutional outputs 140. In more complex networks, e.g., with a larger filter size, such as for 3×3 or 5×5 filter size, the number of multiplication operations can rapidly expand.

Figure 2:
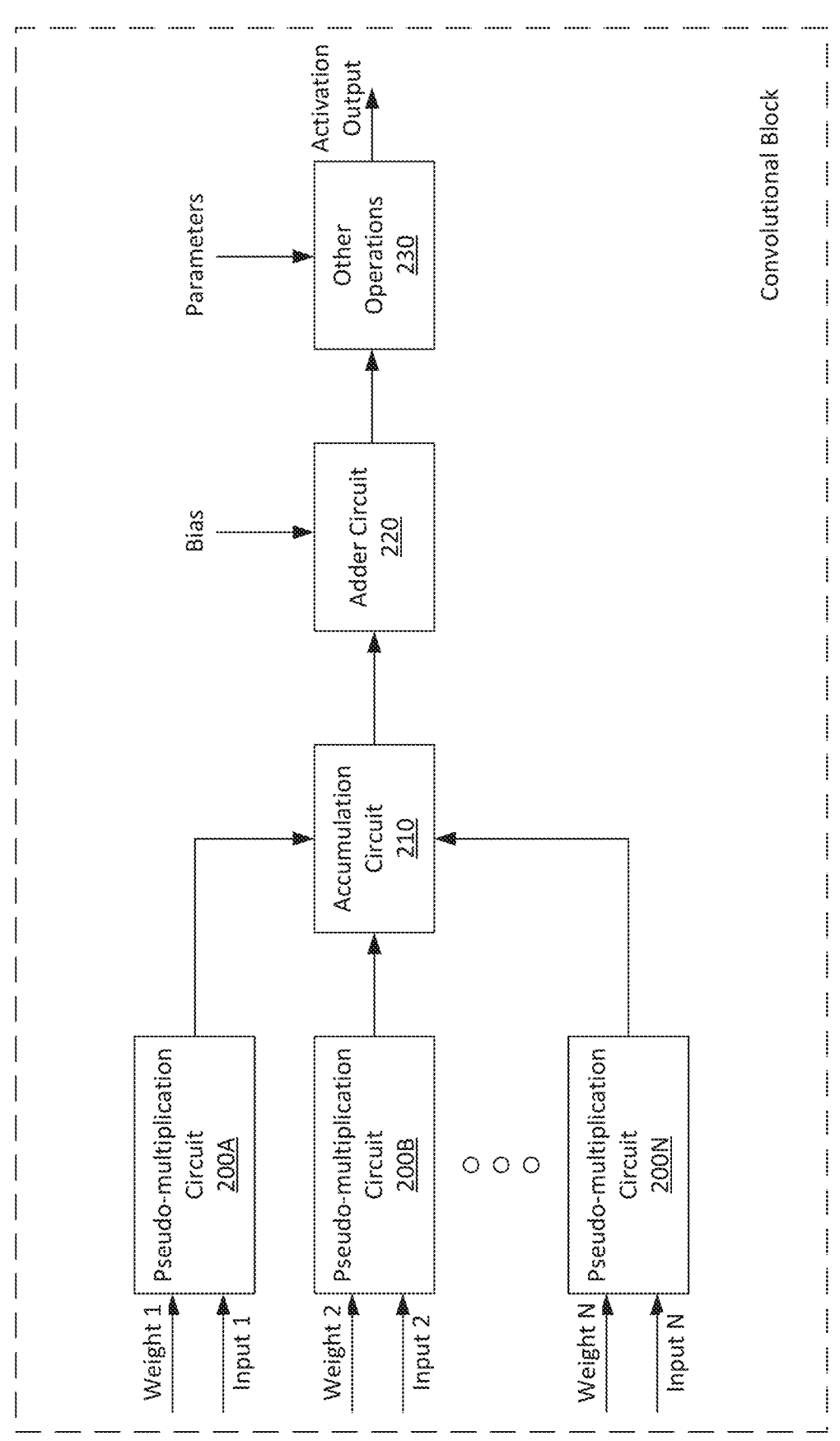
FIG. 2 shows an example convolutional block using pseudo-multiplication circuits to implement parallel multiplication, according to one embodiment.

FIG. 2 shows an example convolutional block using pseudo-multiplication circuits to implement parallel multiplication, according to one embodiment. The convolutional block may include a multiply-and-accumulate circuit that includes a set of pseudo-multiplication circuits 200. Each pseudo-multiplication circuit 200 receives an input and multiplies the input by the respective weight for that input. As shown in FIG. 2, the pseudo-multiplication circuits 200 may be arranged in parallel, from pseudo-multiplication circuit 200A and pseudo-multiplication circuit 200B to pseudo-multiplication circuit 200N. The results of the multiplication are then summed (i.e., accumulated) by one or more accumulation circuits 210. An additional parameter, called a bias, may also be added with an adder 220 before any final operations 230 are applied to generate the activation output.

In general, numbers are represented in such circuits using a two's complement representation of negative numbers, such that negative numbers are designated by a leading most-significant bit (e.g., which is a 1 when the value is negative and 0 when the value is positive). For example, four bits may be used to signed values by representing a sign with one bit and a magnitude with three bits. Thus, the value of zero is represented as 0000, one is represented as 0001, and negative one is represented as 1111. One advantage of two's complement representation is that numbers may be added directly, such that the addition of negative one and positive one overflows the four-bit counter and yields a value of 0000 to result in zero. However, one complexity of two's complement is that to change the sign of a value requires inverting the bits and adding a one. For example, to convert positive five to negative five, 0101 is inverted to the value of 1010 and a 1 is added to yield 1011. As a result, in typical multiply-and-accumulate circuits that implement convolutional blocks, when a negative weight is applied to an input, applying the negative sign in requires both multiplication and addition to properly account for the negative weight.

To improve the parallel multiplication in the convolutional block shown in FIG. 2, the pseudo-multiplication circuits multiply the respective input by the associated weight and, for negative weights, invert the input while deferring the addition of the value that perfects the two's complement representation. For example, a positive six, represented as 0110, multiplied by a −1 is inverted from 0110 to 1001, which is negative seven instead of negative six in a two's complement representation. As a result, the pseudo-multiplication circuits 200 are simplified by applying the multiplication and accounting for change in sign without the additional addition to perfect (e.g., complete) the one's complement arithmetic. To complete the two's complement, an additional value may be added later in the circuit, such as to the bias addition of the adder 220. Though shown as added by separate adder 220, the bias may be included as one of the values added in the accumulation circuit 210. The bias may thus be modified by an amount to account for each of the negative weights in the pseudo-multiplication circuit. In one embodiment, as discussed further below, the modified bias is determined when the neural network is configured to be executed on a circuit including such pseudo-multiplication circuits 200.

Although one accumulation circuit 210 is shown in FIG. 2, in various embodiments multiple accumulation circuits may be used to accumulate the results of the pseudo-multiplication circuits 200A-N. The accumulation may thus be performed in one or more phases or clock cycles depending on the size of the input kernel and clock frequency.

Additional operations 230 may also be performed by additional circuits before outputting a result of the convolutional block. For example, the accumulated, weighted value from the inputs after the bias addition may then be applied to an activation function to convert the value to an output value. While within the convolutional block the circuits may represent values in an expanded range, such as a 32-bit integer or as a floating-point value, the output of the convolutional block may be limited to a smaller range of values (e.g., a 4, 8, or 16-bit unsigned integer). This output may also represent the activation of the convolutional block and may be limited in size similarly to the input size as noted above. An activation function may be used to map the biased, accumulated value to the output range. The activation function may be a linear or nonlinear function, and examples of activations include rectified linear activation functions, a sigmoid function, hyperbolic tangent, among others.

These pseudo-multiplication circuits 200 thus reduce the area of the parallel multiplication and may further improve timing of the circuit and reduce the amount of time required for the parallel multiplication to complete (as the additional addition for negative weights at the multiplication step is omitted).

Figure 3:
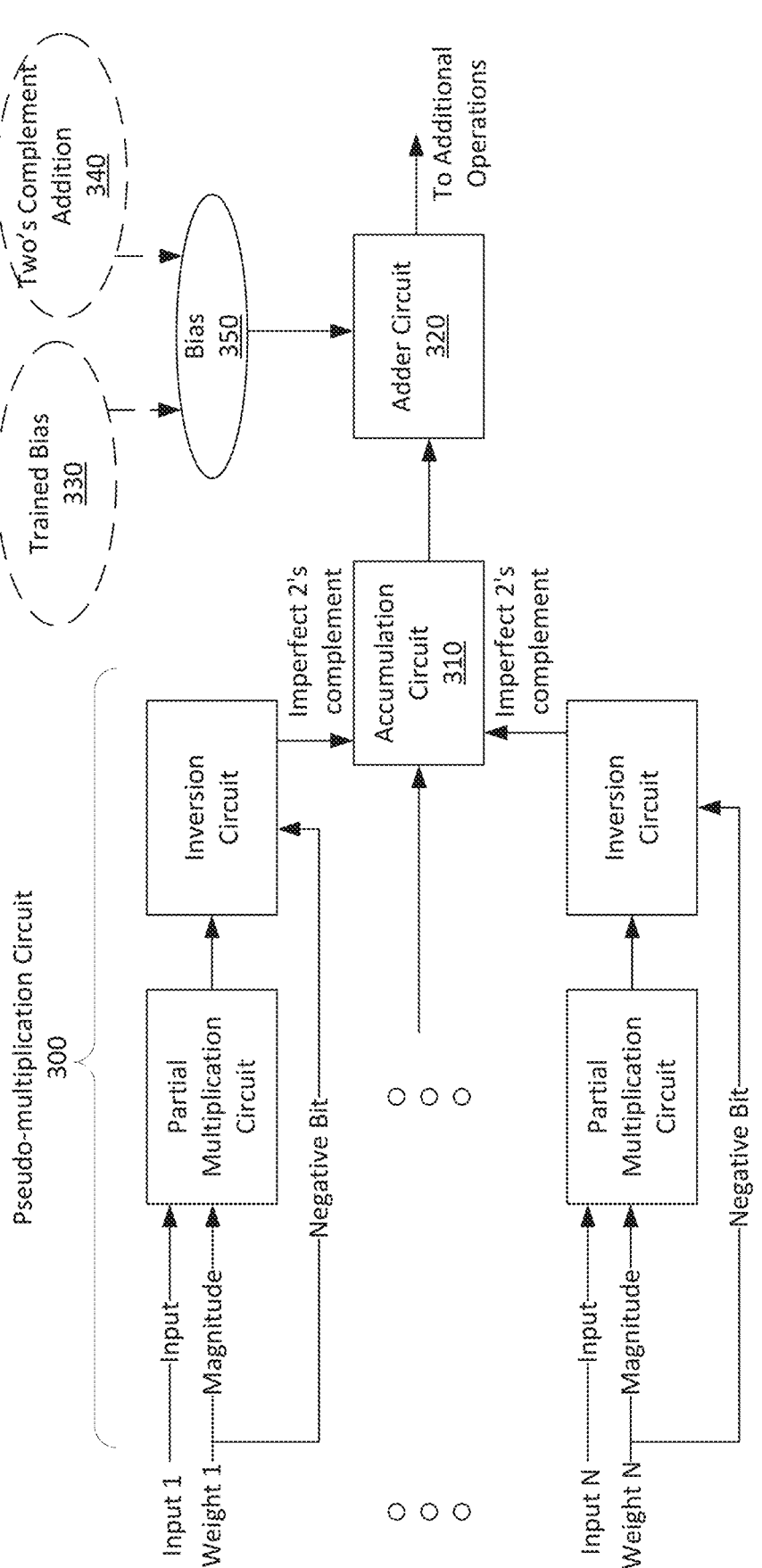
FIG. 3 shows another example of a convolutional block using pseudo-multiplication circuits 300, according to one embodiment.

FIG. 3 shows another example of a convolutional block using pseudo-multiplication circuits 300, according to one embodiment. Similar to the example of FIG. 2, the pseudo-multiplication circuit receives an input and a respective weight and generates an output. FIG. 3 shows a pseudo-multiplication circuit that separately applies the magnitude of the weight and the negative bit of the weight. In this example embodiment, the pseudo-multiplication circuit includes a partial multiplication circuit that performs multiplication of the input with the magnitude of the weight (e.g., without modifying the sign of the input). In some embodiments, the inputs are unsigned integers, in which case the partial multiplication circuit may perform an unsigned multiplication of the input with the respective weight magnitude. To address the negative bit of the weight, the result of the multiplication circuit is provided to an inversion circuit which inverts the result when the negative bit is set (e.g., the negative bit is 1). The result of the inversion circuit is thus an imperfect 2's complement (e.g., with incomplete arithmetic for negative weights) multiplication of the input with the weight. This imperfect 2's complement multiplication result is provided to the accumulation circuit 310. The plurality of pseudo-multiplication circuits thus each provide an imperfect 2's complement result to the accumulation circuit 310 that accumulates the results and provides the accumulated result to an adder 320. As noted with respect to FIG. 2, the bias 350 may be added as part of the accumulation circuit 310 rather than via a separate adder 320. As shown in FIG. 3, the trained bias 330 as determined by the trained convolutional layer may be modified by the two's complement addition 340 to generate the bias 350 to be added to the result of the accumulation circuit 310. In one embodiment, the value of the two's complement addition 340 (and thus the amount the trained bias 330 is increased) is based on the number of negative weights in the pseudo-multiplication circuits. In this example, the negative bit for each pseudo-multiplication circuit may also be routed (not shown) to be added to the trained bias 330. In this example, each negative bit adds one to the trained bias 330.

In another embodiment, the bias is increased in software after training to account for implementation of the convolutional layer on a convolutional block including a pseudo-multiplication circuit. Stated another way, the trained bias 330 may be modified offline when the computer model is prepared for execution in hardware that includes a pseudo-multiplication circuit. In this situation, the bias 350 received by the convolutional block (e.g., the MAC circuit of the various embodiments discussed herein) may not be further modified by the hardware convolutional block, as that modification was already performed. In this example, the pseudo-multiplication circuits 300 may generate imperfect 2's complement, and the arithmetic may be completed by a bias value modified, by the model training or execution software, to complete the two's complement arithmetic.

Figure 4:
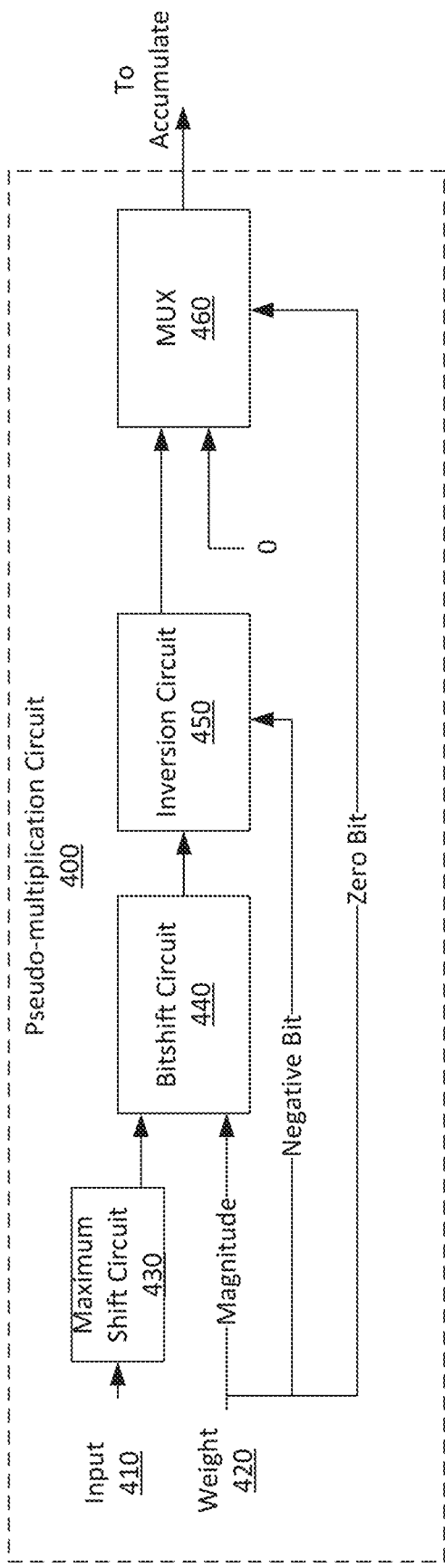
FIG. 4 shows a pseudo-multiplication circuit, according to one embodiment.

FIG. 4 shows a pseudo-multiplication circuit, according to one embodiment. The embodiment of FIG. 4 may be used in multiply-and-accumulate circuits such as the convolutional blocks as discussed with respect to FIGS. 2 and 3. In the embodiment of FIG. 4, the pseudo-multiplication circuit implements the multiplication via a bitshift operation (also referred to simply as "bitshift" or "shift") on the input data. By using a bitshift, the area and power requirements required to implement the multiplication are reduced significantly relative to a complete multiplication operation and particularly so when implemented in combination with the deferred two's complement addition as discussed above. This approach also permits reprogramming of weight values for the circuit during operation and thus re-use of the convolutional block (or MAC) that uses the pseudo-multiplication circuit 400. Such reprogramming and reuse are not possible with typical optimized architectures that fix weights, while typical reprogrammable MAC circuits are slower and have lower throughput. Finally, by implementing the multiplication as a bitshift, the weights may be encoded relative to the number of shifts required, reducing the memory and circuit requirements for storing, transmitting, or manipulating the weights.

The bitshift may thus apply weights that are powers of 2 to the input. The exponents may be positive (typically denoted as a left-ward shift towards a most-significant bit) or may be negative (typically denoted as a right-ward shift towards the least-significant bit). For example, value of allowable weights to be used as a magnitude by a pseudo-multiplication circuit 400 may include $2^4$, $2^3$, $2^2$, $2^1$, $2^0$, $2^{-1}$, $2^{-2}$, $2^{-5}$, and so forth. To implement these weights effectively, during training the computer model may be trained with a constraint that the weights may only have a magnitude that is a power of 2. As another example, the computer model may be trained with a more continuous weight range that is then converted or encoded to a weight range for implementation in a pseudo-multiplication circuit using a bitshift. As another example, the computer model may be initially trained with a more continuous weight range (e.g., as a float), and then fine-tuned to constrain the weights to powers of 2 for implementation.

The pseudo-multiplication circuit 400 receives an input 410 and a weight 420 to be multiplied together. In the embodiment shown in FIG. 4, the weight 420 is encoded to include a magnitude, a negative bit, and a zero bit. As one example, if M is the number of bits encoding the weight magnitude, the weight 420 may encode the magnitude of the weight in bits $[0\text{-}M_{-1}]$, the negative bit in bit $[M]$, and the zero bit in bit $[M_{+1}]$ of the weight 420. Other orderings and weight encoding schemes may also be used with correspondingly different circuit configurations.

In one embodiment, the magnitude of the weight 420 encodes the number of bitshifts to perform relative to a maximum shift as performed by the maximum shift circuit 430. In this embodiment, the input 410 is first shifted to the maximum range of the weights that the pseudo-multiplication circuit 400 is configured to perform. Stated another way, the "maximum shift" represents the maximum multiplication that may be performed by the pseudo-multiplication circuit 400 by weight 420 (e.g., if the weight is zero). The maximum shift circuit 430 is thus a circuit that performs a bitshift to the input to position the input 410 at the maximum range of weights for the pseudo-multiplication circuit 400.

In this example, the input is initially shifted the maximum amount and then the magnitude of the weight 420 is used to shift the input 410 an amount relative to the maximum amount. The application of the magnitude of the weight 420 to the max-shifted input 410 is performed by a bitshift circuit 440. The bitshift circuit 440 receives the output of the maximum shift circuit 430 and is configured to shift it by an amount of the magnitude of the weight. The maximum value and the range of the weights may be determined and implemented in the pseudo-multiplication circuit 400 based on the weights trained for the convolutional block in the neural network. For example, the network during training may determine that weights for the convolutional block may range from $2^4$ to $2^{-2}$. In this example, the number of encoded bits for the magnitude may be 3, allowing the shift to have a range of 8 (the numbers 0-7 represented as 000-111). In this example, the multiplication circuit may be configured to shift the bits a maximum of $2^4$ with a range of $2^8$, such that the values may be multiplied (shifted) within a range of $[2^4$ to $2^{-3}]$. As such, the maximum shift is used as a starting position for further shifts based on the encoded magnitude.

Although the embodiment shown in FIG. 4 initially applies a maximum shift, in other embodiments a minimum shift is initially applied (to minimize the value relative to the range), and a subsequent bitshift based on the magnitude of the weight increases the value of the input. Accordingly, the initial shift may be applied to shift the input to the end of a weight range of the pseudo-multiplication circuit 400, and the shift magnitude of the weight may be applied relative to the end of the weight range.

In this embodiment, the weight 420 used in the pseudo-multiplication circuit 400 is encoded to include a magnitude, a negative bit, and a zero bit. As just discussed, the magnitude represents the magnitude of the multiplication as a number of bitshift operations. Stated another way, the magnitude n is applied as a bitshift operation to apply a $2^n$ multiplication to the input 410. In one embodiment, as shown in FIG. 4, the magnitude is encoded to apply the shift relative to the maximum shift. The encoded weight magnitude, then, is the logarithm base 2 ($\log_2$) of the trained weight of the value for the convolutional block in the neural network. For example, the magnitude of the encoded weight of this embodiment is defined by: weight=$\log_2$(abs(weight)).

After the magnitude of the weight is applied by the bitshift circuit 440, the output of the bitshift circuit 440 is received by an inversion circuit 450, which applies an inversion based on the negative bit of the weight 420. For example, the inversion circuit 450 may be implemented as an XOR circuit that is applied when the negative bit is positive. As shown in FIG. 4, the pseudo-multiplication circuit 400 applies an inversion to apply a negative value but does not include the addition to perfect the two's complement negative value. As discussed with above, deferring the two's complement addition (and generating an imperfect two's complement result) can yield a reduced complexity pseudo-multiplication circuit.

Because a bitshift may not directly designate a zero, a zero bit may designate a zero value more effectively and with reduced circuit complexity relative to representing a zero value in a bitshift. A zeroing circuit may be used to apply the zero bit and output a zero from the pseudo-multiplication circuit when the zero bit of the weight is set. In this example, a multiplexer (MUX) 460 may be used to apply the zero bit by selecting a zero value as an output when the zero bit of the weight is active. Otherwise, the MUX 460 outputs the result from the inversion circuit 450 to proceed, for example to an accumulation circuit (e.g., as shown in FIGS. 2 and 3). In other configurations, the zero bit may be implemented in other ways to zero the result of the pseudo-multiplication circuit, such as by zeroing the input 410 prior to entering the maximum shift circuit 430. As another example, the zero bit may be implemented to additionally disable the shift and inversion circuits when a zero weight is implemented to reduce the power usage when a zero bit is indicated.

Further, a weight of zero may be implemented without a specially designated zero bit in other configurations. For example, a zero weight may be implemented with a bitshift magnitude that exceeds the register length of the output of the bitshift circuit 440.

In experiments in which weights were encoded as a power of two, synthesis of the circuit relative to non-encoded weights yielded a 46% improvement in circuit area. In addition, in experiments in which the two's complement arithmetic was deferred, the two's complement deferral reduced circuit area between 29-34% depending on the number of input points/multiplications for which the addition was deferred.

Re-Usable Convolutional Block With Active Channel Weights

Figure 5:
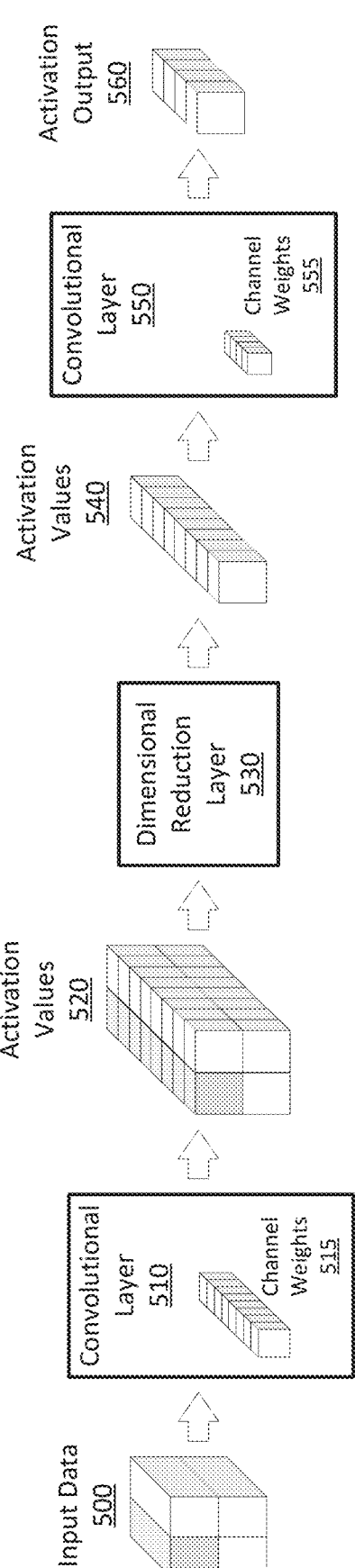
FIG. 5 shows an example neural network model architecture with a dimensional reduction layer.

FIG. 5 shows an example neural network model architecture with a dimensional reduction layer 530. In the example network of FIG. 5, a 2×2×1 dimensional input data (e.g., a two-by-two pixel area in an image) is processed to yield one 1×1×4 output 560. In this example, the convolutional layer 510 is a 1×1 convolutional layer that operates on the channels of a 1×1 region of the input data 500. For example, the 1×1 region may describe a single pixel of an input image associated with the input data 500. The pixel may be described by red, green, and blue color values, together forming three channels of data for each pixel (not shown in FIG. 5). In various networks, the dimensions of the input data 500 and the various network layers may vary as known in the art.

The dimensionality of the data as represented in the network may be increased or decreased by adding or removing additional channels as the data is processed in the network. The number of activations generated by a layer for each set of inputs may be termed the number of channels for that layer. In many neural networks, layers of the network, such as a convolutional layer 510 may increase the dimensionality of the input activations, while other layers may reduce the dimensionality of the input activations, such as the dimensional reduction layer 530. For example, the convolutional layer 510 shown in FIG. 5 creates eight channels of output data from the input data 500. Hence, the result of the convolutional layer 510 are a set of activation values 520, in this example represented as a 2×2×8 matrix.

Although conceptually the convolutional layer 510 transforms the input data 500 to activation values 520, in practice the convolutional layer typically generates the activation values 520 by applying the channel weights to different portions of the input data 500. In the example of FIG. 5, the same channel weights 515 are applied to each 1×1 portion of the input data 500 to generate that portion of the activation values 520. The input data 500 may thus be loaded sequentially and used to sequentially generate the complete set of activation values 520. Depending on the provisioned input data 500 and the provisioned number of convolutional blocks to perform the calculations of the convolution, more or fewer portions of the activation values 520 may be generated at a time by the hardware implementing the neural network.

In one embodiment, the convolutional layer 510 may be implemented in hardware by any of the convolutional blocks, including pseudo-multiplication circuits, as discussed above. In this example, within one processing period (e.g., a clock tick), one 1×1 pixel of data is input to the convolutional layer 510, which applies the set of channel weights 515 to generate one 1×1×8 portion of activation values 520. In this example, to execute the eight channels of output for an input 500 within one clock cycle, eight convolutional blocks (one for each channel) may be used to process the respective inputs and weights for the channel. Each convolutional block may be implemented as a multiply-and-accumulate circuit such as those discussed above. The processing of one 1×1 portion by this example convolutional layer is shaded in FIG. 5. As a result, it may require a plurality of clock cycles to accumulate the complete activation values 520 from the convolutional layer 510, as the circuitry performing the calculations to complete the set of activation values are used for various portions of the input data 500. In this example, the input data 500 may be rotated each clock cycle and the channel weights 515 may remain constant as the same convolution is applied to different portions of the input data 500. In other embodiments, different weights may be applied to different regions of the input data 500.

Many neural networks, such as ethe example shown in FIG. 5, may include a dimensional reduction layer 530 (such as a pooling layer), which reduce the dimensionality of the activation matrix. While the number of channels may be reduced layer-to-layer by modifying the number of channels of a convolutional layer, in this example the dimensional reduction layer 530 reduces the dimensionality of the input data from 2×2 to 1×1. Stated more generally, the dimensional reduction layer 530 reduces the dimensionality of its input activation values 520 to its output activation values 540 relative to a frequency that input data 500 is processed by prior layers of the network. That is, the input of the dimensional reduction layer 530 (activation values 520) are updated at a frequency based on a number of clock cycles for the convolutional layer 510 to receive and process all required portions of the input data 500 to create the activation values 520 on which the dimensional reduction layer 530 operates. In the example of FIG. 5, four clock cycles is used for the convolutional layer 510 to be applied to each 1×1 portion of the 2×2 input data. As such, because the dimensional reduction layer 530 requires the entire resulting 2×2 region of data, the dimensional reduction layer 530 may only operate on new data one out of every four clock cycles. After dimensional reduction layer 530, the dimensionality of the activation values 540 are thus reduced relative to the activation values 520 and may be limited by the frequency that the input data 500 is processed by the earlier layers.

As a result, when dedicated hardware is provisioned for subsequent layers such as convolutional layer 550 with channel weights 555, the subsequent layers may often starve, as the convolutional layer 550 processes the activation values 540 with the channel weights 555 to generate an activation output 560. That is, because the activation values 540 change based on the frequency of the input data 500 and convolutional layer 510, the convolutional layer 550 may completely process the activation values 540 more quickly (e.g., in one clock cycle) and subsequently starve until the next time the output of the dimensional reduction layer 530 is updated (in this example, every four clock cycles).

In many implementations, network may increase or decrease in dimensionality many times through the network. For example, a region of an image may be provided to a neural network as a 256×256 or 128×128 pixel region for performing object recognition, object tracking, etc. within the image, which may reduce the dimensionality to ultimately process 32×32 or 16×16 blocks regions. This may multiply the effect of the dimensional reduction and cause significant starvation for layers in later portions of the network for circuits that attempt to pipeline such layers in hardware accelerators.

Figure 6:
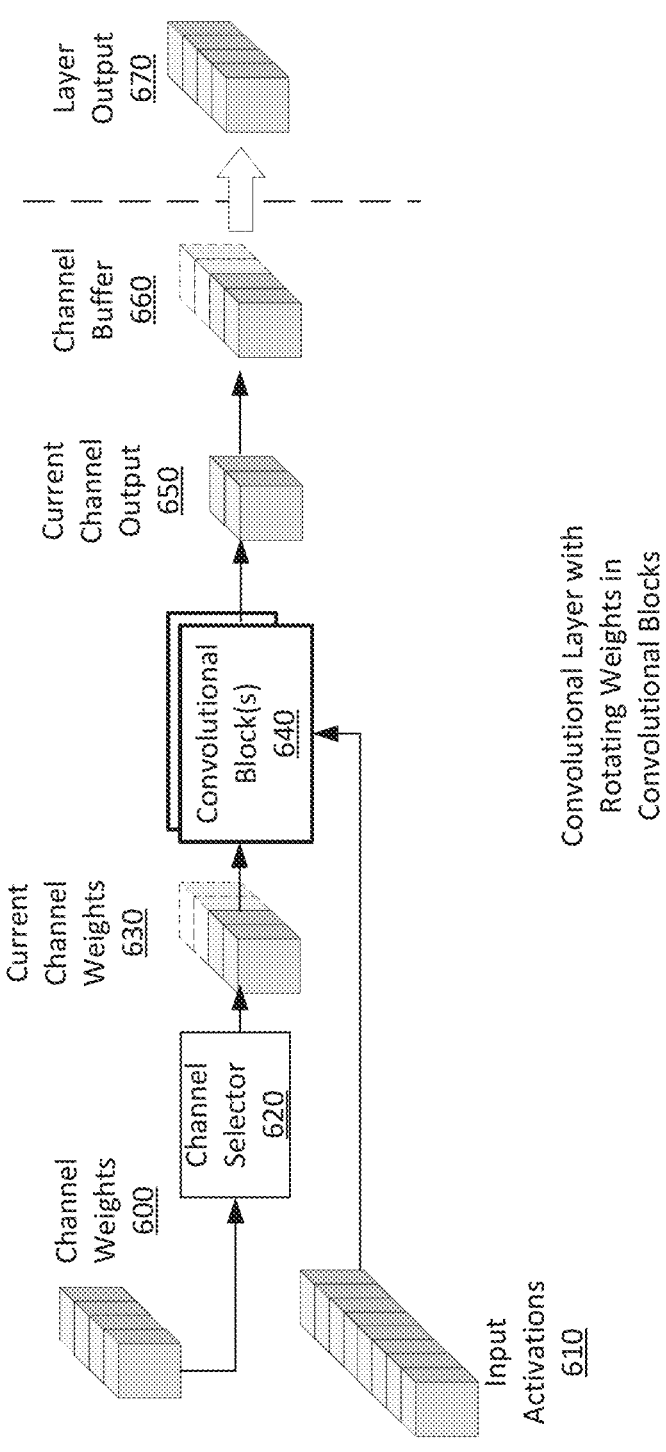
FIG. 6 shows an example for a convolutional layer that reduces starvation after dimensional reduction.

FIG. 6 shows an example for a convolutional layer that reduces starvation after dimensional reduction. The convolutional layer shown in FIG. 6 may be used, e.g., in any portion of the network in which the input activations to the convolutional layer are updated less often than the processing time of the convolutional blocks of the convolutional layer. Stated another way, when the input activations may remain constant for more than one clock cycle in which convolutional blocks may process data for the convolutional layer.

The convolutional layer in FIG. 6 shows an approach for reducing the required circuitry for such a layer that reduces the effective required area of the circuit and increases the uptime frequency. To reduce the surface area, rather than provisioning (i.e., instancing in the hardware) a convolutional block for every channel of the convolutional layer (i.e., circuitry for performing a multiplication between a set of inputs and a set of weights, e.g., a multiply-and-accumulate circuit), the convolutional layer may use fewer convolutional blocks 640 than the number of channels in the convolutional layer. Rather, each convolutional block 640 is configured to apply different weight sets at different clock cycles. At each clock cycle, a subset of the channel weights 600 are applied, such that over a plurality of clock cycles (e.g., the update frequency of the input activations 610), the complete set of output channels are generated.

The convolutional layer receives a set of input activations 610 from one or more previous layers of the network. For example, the output from a dimensional reduction layer 530. Similarly, the convolutional layer receives (or accesses) a set of channel weights 600 defining the weights for the complete set of output channels for the convolutional layer. The set of channel weights 600 may be fixed or may be stored in a programmable register that may be reprogrammed according to a particular neural network configuration.

A channel selector 620 selects a subset of the channel weights as current channel weights 630 to be applied by the convolutional blocks 640. The weights applied by each convolutional block in a particular clock cycle thus correspond to respective channel weights of the current channel weights 630. Each convolutional block 640 is circuitry configured to perform one convolution (e.g., a multiplication and accumulate, optionally with additional parameters) on the set of input activations 610 using one set of filter weights (e.g., the weights for one output channel as shown by filter weights 122 of FIG. 1). The convolutional block 640 may include any suitable multiply-and-accumulate circuit for performing the convolution, which may include any of the pseudo-multiplication circuits discussed above.

In the example of FIG. 6, two convolutional blocks 640 are provisioned for the convolutional layer in which the input activations 610 are constant for two clock cycles (e.g., due to a previous dimensionality reduction in the network). In this example, the channel weights 600 include four channel weights $W_0$-$W_3$. The channel selector 620 selects subsets of two channel weights (one corresponding to each of the provisioned convolutional blocks 640). Each clock cycle, the channel selector 620 may select a different subset of the channel weights 600. In one example, the channel selector is a multiplexor that uses the clock cycle to select different subsets of the channel weights 600 to be applied by the convolutional blocks 640. Thus, in this example, during a first clock cycle the channel selector 620 may select a first subset of weights $W_{0,1}$ from the set of channel weights 600. During a second clock cycle, the channel selector may select a second subset of weights $W2,3$ from the set of channel weights 600.

At each clock cycle, the provisioned convolutional blocks 640 apply the received current channel weights 630 to the input activations 610 to perform the relevant convolution calculations for the corresponding channel. In this example, a first convolutional block 640 in the first clock cycle applies current channel weight $W_0$ and a second convolutional block 640 in the first clock cycle applies current channel weight $W_1$. The output of the convolutional blocks 640 are designated the current channel output 650 and are stored in a channel buffer 660 in relation to the subset of channels selected by channel selector 620. For example, when weights W0 and W1 are the current channel weights 630, the current channel output 650 is stored to positions in the channel buffer 660 corresponding to channels 0 and 1 of the output of the convolutional layer. The channel buffer 660 may store the values of the channel until the complete set of output channels is assembled and can be output as the layer output 670.

In the next clock cycle, the channel selector 620 selects another subset of channel weights 600 as the current channel weights 630, for example to select weights W2,3. The convolutional blocks 640 apply the respective weights for each channel and the current channel output 650 is stored to the channel buffer 660 at positions corresponding to the selected subset, now to channels 2 and 3. After a number of clock cycles for cycling through the subsets of the channel weights 600, the complete set of channel outputs may be loaded into the channel buffer 660. As a result, in this example over the clock cycles in which the input activations 610 are constant, the convolutional blocks 640 receive and apply the full set of channel weights 600 to the input activations 610.

As a result, the number of convolutional blocks 640 provisioned for implementing the convolutional layer may be based on the number of channels and the number of clock cycles in which the input activations 610 may be held constant (e.g., as a function of the dimensional reduction of earlier layers in the network). As shown in FIG. 5, a dimensional reduction with a factor of four (e.g., 2×2 is reduced to 1×1) may yield a similar number of clock cycles (e.g., four) for which the input to the convolutional layer 550 may be held constant. Thus, in general, the number of convolutional blocks used to implement the convolutional layer may be reduced and does not require a complete convolutional block for each channel to be implemented in the layer. Rather, the number of convolutional blocks provisioned in the circuit (and hence the size of the subset of channels that may be applied in parallel) may be the total number of channels for the layer divided by the dimensional reduction of prior portions of the network (e.g., the number of clock cycles for which the input activations may be constant). When multiple dimensional reduction layers are applied earlier in the network, the number of blocks may account for the combined reduction that occurred previous to the convolutional layer. For example, if one layer reduces the dimensionality by 2 and another by 4, the dimensional reduction relevant to provision of convolutional blocks at the layer may be 8 (2×4). Thus, to continue this example, if the full set of channels for the layer has 32 channels, and the prior layers have a dimensional reduction factor of 8 (and hence that the input activations 610 may remain constant for 8 clock cycles), four convolutional blocks may be used (32 channels divided by a reduction factor of 8).

By rotating the weights in this way and provisioning convolutional blocks for the circuit accordingly, the provisioned circuit area for these downstream portions of a network may be significantly reduced while increasing utilization of the circuits. Any number of these convolutional blocks or layers may be placed in series or parallel based on the design of the network as a whole.

FIGS. 7A-7D show an example time sequence of a network including rotating weights and input activations of prior network layers according to various embodiments. Each FIG. 7A-7D shows the inputs and activations of layers of a simple example network in which a convolutional layer 710 receives a set of input data 700 to generate a set of activations 720, which are processed by a dimensional reduction layer 730 to generate activations 740. In this example, the dimensional reduction layer 730 receives four sets of activations 720 to reduce the dimensionality of the activations 720 by a factor of four from 2×2 to 1×1. The activations 740 are input to a convolutional layer 750 that uses rotating subsets of weights to generate a final output activation 770 for the convolutional layer 750. The convolutional layer 750 may be implemented, e.g., with the circuit discussed with respect to FIG. 6. The example of FIGS. 7A-7D illustrate the plurality of clock cycles used for generating the input to the dimensional reduction layer 730 and to generate the channels in a channel buffer 760 for the output of the convolutional layer 750 using rotating current channel weights 755. In this example, the complete channel weight set to be applied by the convolutional layer 750 includes four channels. Also as shown in this example, the convolutional layer 750 may include one convolutional block to process one channel weight set each clock cycle. As discussed above, the circuit may be provisioned a number of convolutional blocks based on dividing the number of channels by the amount of dimensional reduction, in this case dividing four channels for convolutional layer 750 by the dimensional reduction of four.

Figures 7A, 7B:
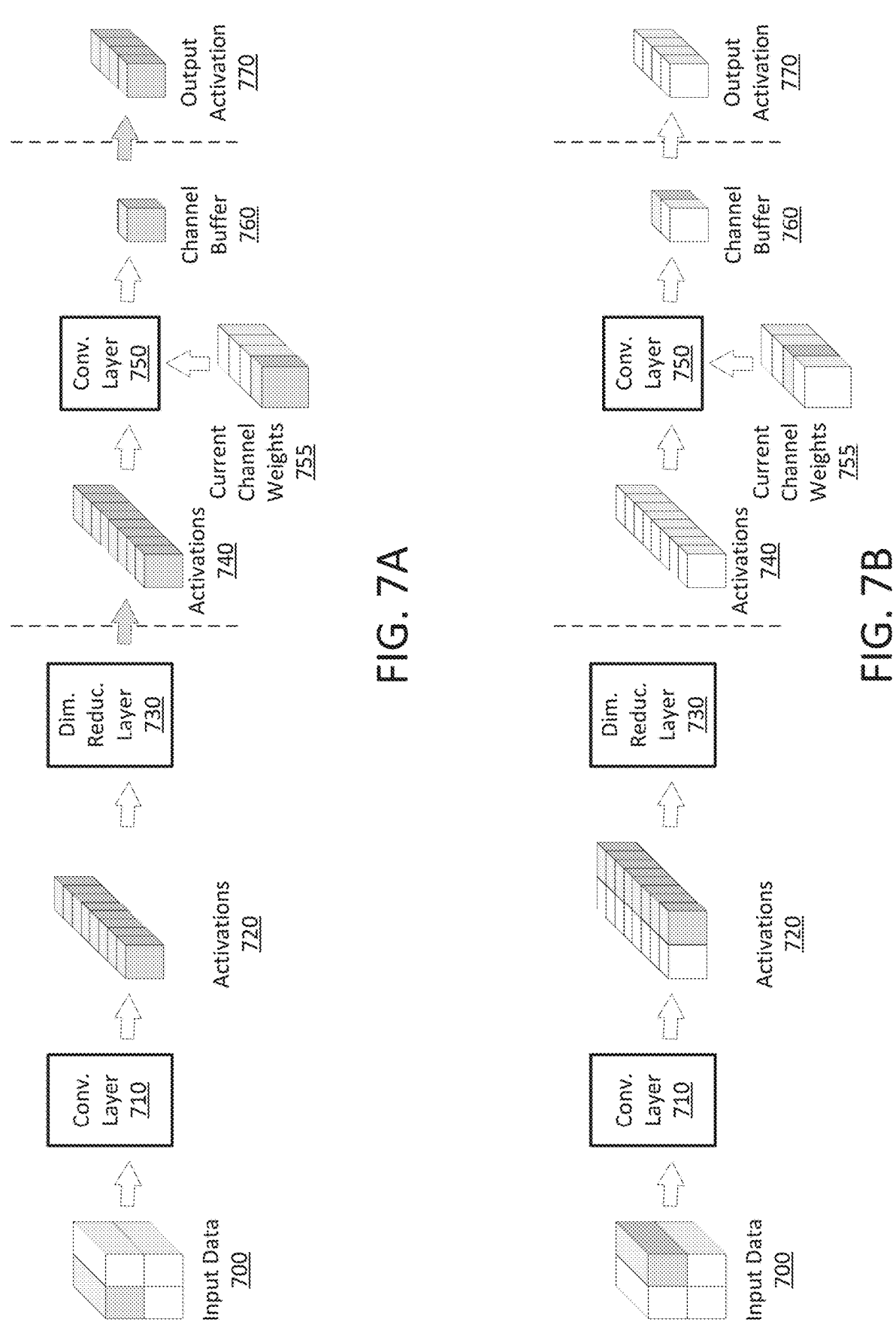
FIGS. 7A-7D show an example time sequence of a network including rotating weights and input activations of prior network layers according to various embodiments.

In general, the circuit architecture shown in FIG. 7A may be used for streaming/pipelining a large number of sequential input data 700. Although one 2×2 region of input data 700 is shown in FIGS. 7A-7D, in typical applications new input data 700 is loaded after the prior set of input data is processed by the network (or the first layer(s) of the network). As one example for image processing applications, each set of input data 700 may represent areas or portions of an image that may be processed by the network overall. For example, sliding "windows" of 2×2 input data 700 may be input to the network. Because the circuit is pipelined, each further portion of the network may simultaneously operate on different sets of input data 700. For example, while the convolutional layer 710 operates on a first set of input data 700 to generate activations 720, a second set of 2×2 input data 700 may have previously been processed and converted by the dimensional reduction layer 730 to create activations 740. Similarly, a third set of 2×2 input data may have completed its processing by the convolutional layer 750 to be output as output activation 770. In that sense, the network circuit may "stream" or "pipeline" sets of input data 700. In this example, the number of clock cycles required to assemble sufficient data for the dimensional reduction layer 730 may determine the frequency that sets of input data 700 are passed to further layers of the model. In this example, the dimensional reduction layer 730 consumes four sets of output channels from the convolutional layer 710, reducing the dimensionality of the prior layer by a factor of four. Example data processing in the network discussed with respect to FIGS. 7A-7D occurs over four clock cycles and represent processing of a new 2×2 block of input data 700.

On the transition to the first clock cycle shown in FIG. 7A, activations 740 are updated from the output of the dimensional reduction layer 730 operating on a prior set of input data, and likewise the output activation 770 from the convolutional layer 750 may be updated from the prior channel buffer 760.

As shown in FIG. 7A, during the first clock cycle the convolutional layer 710 is applied to a first portion of loaded input data 700. In this example, the convolutional layer 710 includes circuitry to apply weights and generate eight channels of output from the input 1×1 region of input data 700. In this example, the convolutional layer 710 may include sufficient convolutional blocks (e.g., in parallel) to completely process the relevant portion of input data 700 in one clock cycle to produce a full set channel activations for that input data 700. As shown by FIG. 7B (showing a second clock cycle), the convolutional layer 710 may process a second, separate portion of the input data 700 in the second clock cycle. In contrast, while the convolutional layer 710 receives and processes different input data completely each clock cycle, the convolutional layer 750 applies a subset of the full channel weights in each clock cycle. As shown in FIG. 7A, the current channel weights 755 to be applied by the convolutional layer 750 is a first subset of the current channel weights. The output of the convolutional layer 750 is stored in the channel buffer 760.

Figures 7C, 7D:
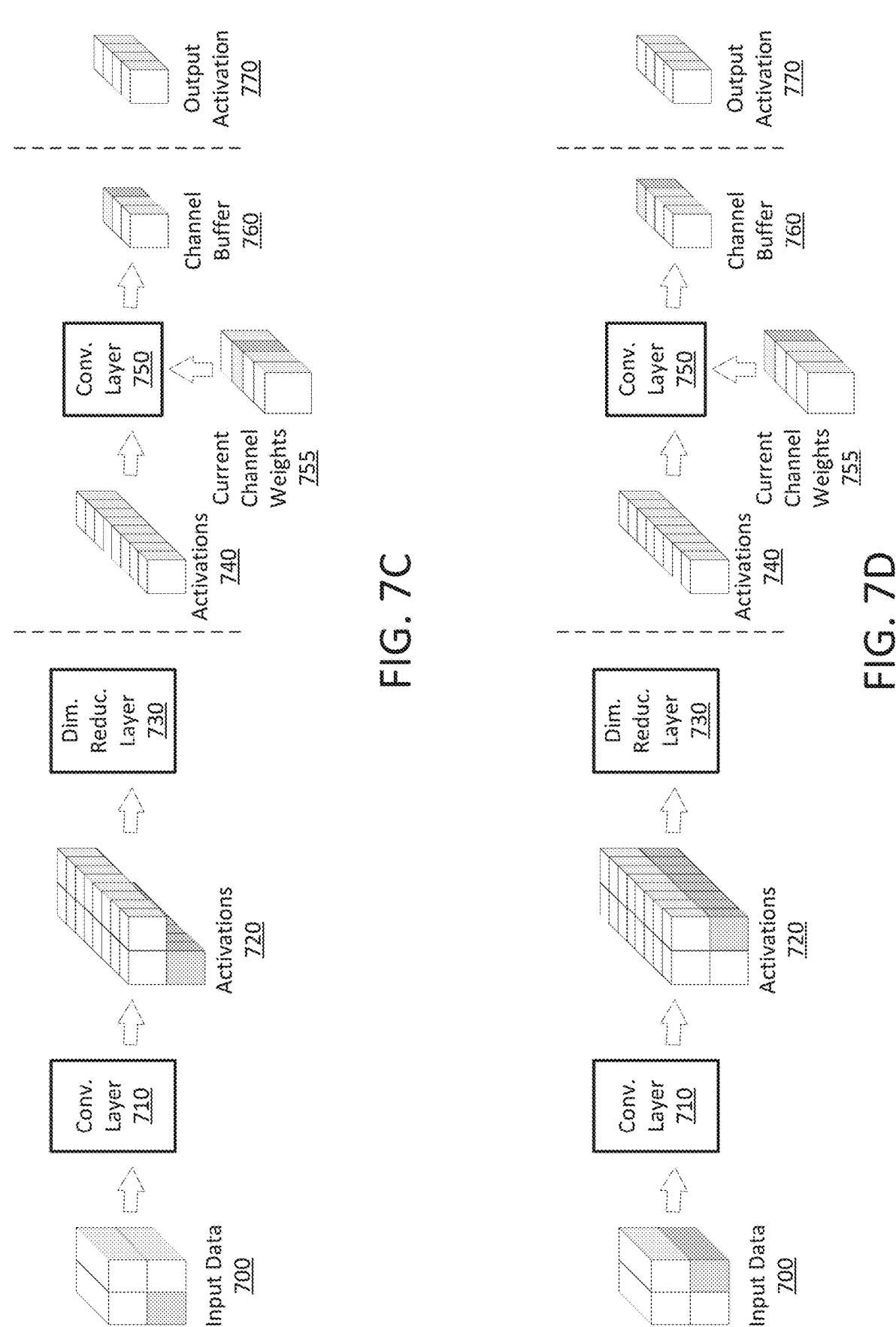

In the second clock cycle, shown in FIG. 7B, a new portion of the input data 700 is processed by the convolutional layer 710 to generate another set of activations 720. Meanwhile, a second subset of channel weights is selected as current channel weights 755 to be applied by convolutional layer 750 to generate a second channel output stored in the channel buffer 760. As shown in FIGS. 7C and 7D, a third and fourth portion of the input data 700 is processed by convolutional layer 710 while the third and fourth subsets of the channel weight are selected the current channel weights and the third and fourth channels are stored in the channel buffer 760 in third and fourth clock cycles, respectively.

As shown in FIGS. 7A-7D, while the portion of loaded input data 700 may be completely consumed with each clock cycle by convolutional layer 710, enabling the read/write timing and provision of convolutional blocks for convolutional layer 710 to control throughput, due to the dimensional reduction, later layers may less-frequently receive new data, and rather than provision enough convolutional blocks for completely consuming activations in one clock cycle, these layers, such as convolutional layer 750, may use less circuitry and instead re-use the convolutional blocks using rotating channel weights. This approach allows for hardware accelerator to more effectively and with less surface area streamline and process data in neural networks. In conjunction with other techniques, such as the pseudo-multiplication circuits and encoded weight encoding discussed above, such circuits may significantly reduce effective area for such circuits and increase circuit utilization.

As such, these approaches for improving neural network accelerators may be used individually or in conjunction with one another. For example, a network such as the one shown in FIGS. 7A-7D may implement pseudo-multiplication circuits in the hardware which processes convolutional layer 710 or convolutional layer 750, each of which may include deferred one's complement addition for each negative weight, and in further embodiments which may perform multiplication using bitshift and/or use encoded weight values as discussed with respect to FIG. 4.

Hardware-Software Co-design

FIG. 8 shows an example flowchart for optimizing a neural network for implementation in specialized hardware as disclosed herein, according to one embodiment. For example, FIG. 8 illustrates an approach that may be used by a computer system to optimize a trained computer model for use with the circuitry disclosed above, and in other embodiments to use the computer model to determine the structure and optimization of the circuitry and may include using characteristics of the model to modify training of the model.

In a simple example of the flow of FIG. 8, computer system optimizing the network identifies 810 parameters of a neural network, such as the weight and bias parameters for a convolutional layer of the neural network, and also identifies 820 characteristics of circuits in which the network/layer will be implemented, such as any of the convolutional blocks as discussed above. In one embodiment, the computer system may also train 800 the neural network. In some embodiments, the neural network may be trained based on the characteristics of the circuits, while in other embodiments, the characteristics of the circuits are used to "translate" the trained neural network parameters (e.g., the logical structure and processes), to the values for use in the implementing hardware circuitry.

As such, in one example embodiment, the circuit implementing the network may implement a bitshift multiplication as discussed with respect to FIG. 4, in which the weights that may be applied in the hardware are powers of two. In this example, the neural network may be trained 800 (or fine-tuned) with the constraint that the weights must be powers-of-two as implementable by a bitshift operation. As another example, the number of bits available to transfer data between activation layers of the network may also be modified to reduce the surface area and complexity of the network. For example, the activation values for a layer may be specified in the network as 1, 2, 4, 6, or 8 bits or another length determined by the skilled artisan to reduce the complexity of data transferred between circuits of the network and based on the complexity of the designed circuit on which the network will be implemented. In one example, the bits may be unsigned between activation layers of the network, such that activation values for a 4-bit unsigned value may comprise integers in the range [0-15]. In this example, the limited range of activation values may also be used to train or fine-tune the parameters of the neural network to directly incorporate characteristics of the implementing circuitry into the network training. Additional types of network characteristics may also be used.

Using the trained neural network parameters, the parameters may be modified 830 for implementation in circuits having the designated characteristics. For example, for each channel (e.g., each individual convolutional filter) of a convolutional layer, the trained neural network may specify a set of weights as well as a bias (as well as additional parameters).

To implement the filters in a circuit that implements pseudo-multiplication circuits, the bias as specified by the trained neural network may be modified to account for the imperfect (deferred) two's complement multiplication performed by the pseudo-multiplication circuits. As such, the bias may be modified such that the bias, as implemented in the circuit, perfects the two's complement multiplication. Since the two's complement representation is incorrect when a negative value is applied (I.e., the inversion to reverse the sign is not completed with an addition of a one), the bias may be increased by an amount based on the number of negative weights are in the network. In this example, the bias for a convolutional block may be increased by one for each of the negative weights in that convolutional filter (i.e., a particular channel) of the network. Thus, a filter with weight of [0.5, 0.2, −0.3, −0.7, 0.1, 0.3, 0.8, 0.25, −0.1] and a bias of +2 may have the bias increased by 3 to a modified bias of +5 for the three negative weights in the weight set. When implemented in a convolutional block using pseudo-multiplication circuits, the modified bias of +5 corrects for the three missing addition operations when the negative weights invert the activation.

Similarly, to implement a convolutional filter in a circuit that applies a bitshift operation, the weights of the network may be modified or encoded for execution in a convolutional block using such a filter. For example, the weights may be adjusted or approximated to the nearest power of two. In another example, as noted above, the weights may be trained 800 to already constrain the trained weights to a power of two. In addition, the weights may be encoded for application to the bitshift circuit. As discussed above and shown in FIG. 4, in one embodiment the weight may be represented for the pseudo-multiplication circuit as a magnitude with a negative bit and a zero bit. To encode the weight from the network, after determining the weight as represented as a power of two weight (e.g., if the trained network weight is approximated as a power of two), the magnitude may be encoded based on the number of shifts required relative to an initial shift applied by the circuit. For example, the encoded weight magnitude may be determined by a logarithm base 2 of the weight as discussed above.

In some embodiments, the circuit itself may be designed as part of the process, for example based on the neural network parameters. In one embodiment, the system identifies dimensional reduction blocks and provisions convolutional blocks 840 for the implementing circuitry as discussed with respect to FIGS. 5-7D. For example, the network may be analyzed to determine when dimensional reduction blocks reduce the dimensionality of the network and when further layers may thus starve/the inputs to those layers may remain constant for a number of clock cycles. In this circumstance, the convolutional blocks for those layers may be reduced such that the blocks may apply a subset of the weights for the layer on each clock cycle as discussed above. In this embodiment, the hardware circuitry for implementing the neural network is designed to include weight rotation over clock cycles and thus reduce area for the circuit while reducing starvation. Each layer of the network may be analyzed based on the dimensional reduction of previous layers of the circuit and the number of clock cycles that an input for that layer may remain constant to determine the number of convolutional blocks to provision 840 for that layer. After determining characteristics of the network and provisioning convolutional blocks, the circuit may be generated 850, e.g., via a circuit synthesis tool, to provision individual registers, gate circuitry, etc., for the circuit to be manufactured.

Finally, to execute the neural network on the hardware, the modified parameters are provided 860 for execution on the physical circuit.

Example Computer Modeling

FIG. 9 shows example computer model inference and computer model training. Computer model inference refers to the application of a computer model 910 to a set of input data 900 to generate an output or model output 920. The computer model 910 determines the model output 920 based on parameters of the model, also referred to as model parameters. The parameters of the model may be determined based on a training process that finds an optimization of the model parameters, typically using training data and desired outputs of the model for the respective training data as discussed below. The output of the computer model may be referred to as an "inference" because it is a predictive value based on the input data 900 and based on previous example data used in the model training.

The input data 900 and the model output 920 vary according to the particular use case. For example, for computer vision and image analysis, the input data 900 may be an image having a particular resolution, such as 75×75 pixels, or a point cloud describing a volume. In other applications, the input data 900 may include a vector, such as a sparse vector, representing information about an object. For example, in recommendation systems, such a vector may represent user-object interactions, such that the sparse vector indicates individual items positively rated by a user. In addition, the input data 900 may be a processed version of another type of input object, for example representing various features of the input object or representing preprocessing of the input object before input of the object to the computer model 910. As one example, a 1024×1024 resolution image may be processed and subdivided into individual image portions of 64×64, which are the input data 900 processed by the computer model 910. As another example, the input object, such as a sparse vector discussed above, may be processed to determine an embedding or another compact representation of the input object that may be used to represent the object as the input data 900 in the computer model 910. Such additional processing for input objects may themselves be learned representations of data, such that another computer model processes the input objects to generate an output that is used as the input data 900 for the computer model 910. Although not further discussed here, such further computer models may be independently or jointly trained with the computer model 910.

As noted above, the model output 920 may depend on the particular application of the computer model 910, and represent recommendation systems, computer vision systems, classification systems, labeling systems, weather prediction, autonomous control, and any other type of modeling output/prediction.

The computer model 910 includes various model parameters, as noted above, that describe the characteristics and functions that generate the model output 920 from the input data 900. In particular, the model parameters may include a model structure, model weights, and a model execution environment. The model structure may include, for example, the particular type of computer model 910 and its structure and organization. For example, the model structure may designate a neural network, which may be comprised of multiple layers, and the model parameters may describe individual types of layers included in the neural network and the connections between layers (e.g., the output of which layers constitute inputs to which other layers). Such networks may include, for example, feature extraction layers, convolutional layers, pooling/dimensional reduction layers, activation layers, output/predictive layers, and so forth. While in some instances the model structure may be determined by a designer of the computer model, in other examples, the model structure itself may be learned via a training process and may thus form certain "model parameters" of the model.

The model weights may represent the values with which the computer model 910 processes the input data 900 to the model output 920. Each portion or layer of the computer model 910 may have such weights. For example, weights may be used to determine values for processing inputs to determine outputs at a particular portion of a model. Stated another way, model weights may describe how to combine or manipulate values of the input data 900 or thresholds for determining activations as output for a model. As one example, a convolutional layer typically includes a set of convolutional "weights," also termed a convolutional kernel, to be applied to a set of inputs to that layer. These that are subsequently combined, typically along with a "bias" parameter, and weights for other transformations to generate an output for the convolutional layer.

The model execution parameters represent parameters describing the execution conditions for the model. In particular, aspects of the model may be implemented on various types of hardware or circuitry for executing the computer model. For example, portions of the model may be implemented in various types of circuitry, such as general-purpose circuitry (e.g., a general CPU), circuitry specialized for certain computer model functions (e.g., a GPU or programmable Multiply-and-Accumulate circuit) or circuitry specially designed for the particular computer model application. In some configurations, different portions of the computer model 910 may be implemented on different types of circuitry. As discussed below, training of the model may include optimizing the types of hardware used for certain aspects of the computer model (e.g., co-trained), or may be determined after other parameters for the computer model are determined without regard to configuration executing the model. In another example, the execution parameters may also determine or limit the types of processes or functions available at different portions of the model, such as value ranges available at certain points in the processes, operations available for performing a task, and so forth.

Computer model training may thus be used to determine or "train" the values of the model parameters for the computer model 940. During training, the model parameters are optimized to "learn" values of the model parameters (such as individual weights, activation values, model execution environment, etc.), that improve the model parameters based on an optimization function that seeks to improve a cost function (also sometimes termed a loss function). Before training, the computer model 940 has model parameters that have initial values that may be selected in various ways, such as by a randomized initialization, initial values selected based on other or similar computer models, or by other means. During training, the model parameters are modified based on the optimization function to improve the cost/loss function relative to the prior model parameters.

In many applications, training data 930 includes a data set to be used for training the computer model 940. The data set varies according to the particular application and purpose of the computer model 940. In supervised learning tasks, the training data typically includes a set of training data labels that describe the training data and the desired output of the model relative to the training data. For example, for an object classification task, the training data may include individual images in which individual portions, regions or pixels in the image are labeled with the classification of the object. For this task, the training data may include a training data image depicting a dog and a person and a training data labels that label the regions of the image that include the dog and the person, such that the computer model is intended to learn to also label the same portions of that image as a dog and a person, respectively.

To train the computer model, a training module (not shown) applies the training inputs 930 to the computer model 940 to determine the outputs predicted by the model for the given training inputs 930. The training module, though not shown, is a computing module used for performing the training of the computer model by executing the computer model according to its inputs and outputs given the model's parameters and modifying the model parameters based on the results. The training module may apply the actual execution environment of the computer model 940, or may simulate the results of the execution environment, for example to estimate the performance, runtime, memory, or circuit area (e.g., if specialized hardware is used) of the computer model. The training module, along with the training data and model evaluation, may be instantiated in software and/or hardware by one or more processing devices such as the example computing device 1100 shown in FIG. 11. In various examples, the training process may also be performed by multiple computing systems in conjunction with one another, such as distributed/cloud computing systems.

After processing the training inputs according to the current model parameters for the computer model 940, the model's predicted outputs are evaluated 950 and the computer model is evaluated with respect to the cost function and optimized using an optimization function of the training model. Depending on the optimization function, particular training process and training parameters after the model evaluation are updated to improve the optimization function of the computer model. In supervised training (i.e., training data labels are available), the cost function may evaluate the model's predicted outputs relative to the training data labels and to evaluate the relative cost or loss of the prediction relative to the "known" labels for the data. This provides a measure of the frequency of correct predictions by the computer model and may be measured in various ways, such as the precision (frequency of false positives) and recall (frequency of false negatives). The cost function in some circumstances may evaluate may also evaluate other characteristics of the model, for example the model complexity, processing speed, memory requirements, physical circuit characteristics (e.g., power requirements, circuit throughput) and other characteristics of the computer model structure and execution environment (e.g., to evaluate or modify these model parameters).

After determining results of the cost function, the optimization function determines a modification of the model parameters to improve the cost function for the training data. Many such optimization functions are known to one skilled on the art. Many such approaches differentiate the cost function with respect to the parameters of the model and determine modifications to the model parameters that thus improves the cost function. The parameters for the optimization function, including algorithms for modifying the model parameters are the training parameters for the optimization function. For example, the optimization algorithm may use gradient descent (or its variants), momentum-based optimization, or other optimization approaches used in the art and as appropriate for the particular use of the model. The optimization algorithm thus determines the parameter updates to the model parameters. In some implementations, the training data is batched and the parameter updates are iteratively applied to batches of the training data. For example, the model parameters may be initialized, then applied to a first batch of data to determine a first modification to the model parameters. The second batch of data may then be evaluated with the modified model parameters to determine a second modification to the model parameters, and so forth, until a stopping point, typically based on either the amount of training data available or the incremental improvements in model parameters are below a threshold (e.g., additional training data no longer continues to improve the model parameters). Additional training parameters may describe the batch size for the training data, a portion of training data to use as validation data, the step size of parameter updates, a learning rate of the model, and so forth. Additional techniques may also be used to determine global optimums or address nondifferentiable model parameter spaces.

Figure 10:
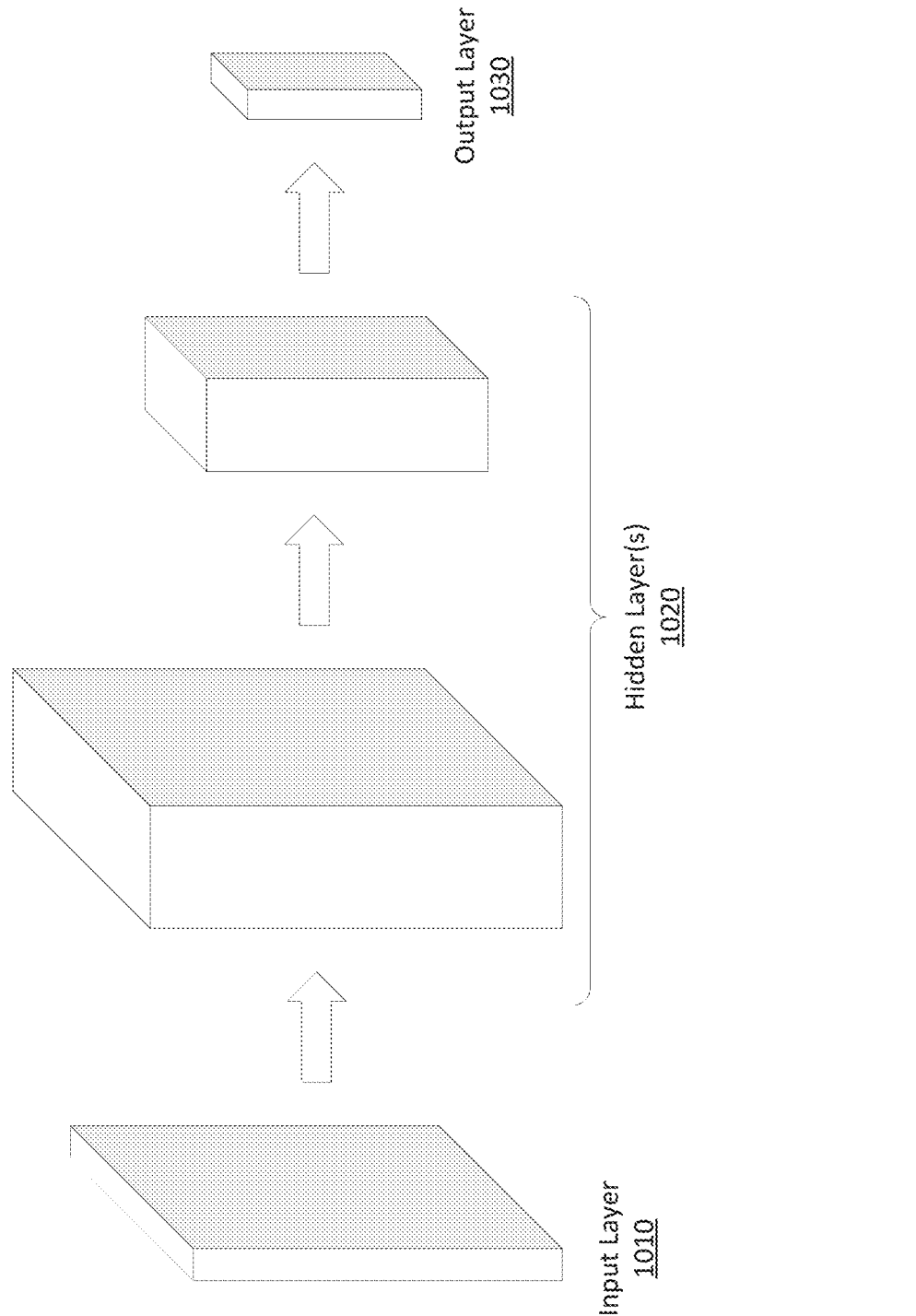
FIG. 10 illustrates an example neural network architecture.

FIG. 10 illustrates an example neural network architecture. In general, a neural network includes an input layer 1010, one or more hidden layers 1020, and an output layer 1030. The values for data in each layer of the network is generally determined based on one or more prior layers of the network. Each layer of a network generates a set of values, termed "activations" that represent the output values of that layer of a network and may be the input to the next layer of the network. For the input layer 1010, the activations are typically the values of the input data, although the input layer 1010 may represent input data as modified through one or more transformations to generate representations of the input data. For example, in recommendation systems, interactions between users and objects may be represented as a sparse matrix. Individual users or objects may then be represented as an input layer 1010 as a transformation of the data in the sparse matrix relevant to that user or object. The neural network may also receive the output of another computer model (or several), as its input layer 1010, such that the input layer 1010 of the neural network shown in FIG. 10 is the output of another computer model. Accordingly, each layer may receive a set of inputs, also termed "input activations," representing activations of one or more prior layers of the network and generate a set of outputs, also termed "output activations" representing the activation of that layer of the network. Stated another way, one layer's output activations become the input activations of another layer of the network (except for the final output layer of 1030 of the network.

Each layer of the neural network typically represents its output activations (i.e., also termed its outputs) in a matrix, which may be 1, 2, 3, or n-dimensional according to the particular structure of the network. As shown in FIG. 10, the dimensionality of each layer may differ according to the design of the layer. The dimensionality of the output layer 1030 depend on the characteristics of the prediction made by the model. For example, a computer model for multi-object classification may generate an output layer 1030 having a one-dimensional array in which each position in the array represents the likelihood of a different classification for the input layer 1010. In another example for classification of portions of an image, the input layer 1010 may be an image having a resolution, such as 512×512, and the output layer may be a 512×512×n matrix in which the output layer 1030 provides n classification predictions for each of the input pixels, such that the corresponding position of each pixel in the input layer 1010 in the output layer 1030 is an n-dimensional array corresponding to the classification predictions for that pixel.

The hidden layers 1020 provide output activations that variously characterize the input layer 1010 in various ways that assist in effectively generating the output layer 1030. The hidden layers thus may be considered to provide additional features or characteristics of the input layer 1010. Though two hidden layers are shown in FIG. 10, in practice any number of hidden layers may be provided in various neural network structures.

Each layer generally determines the output activation values of positions in its activation matrix based on the output activations of one or more previous layers of the neural network (which may be considered input activations to the layer being evaluated). Each layer applies a function to the input activations to generate its activations. Such layers may include fully-connected layers (e.g., every input is connected to every output of a layer), convolutional layers, deconvolutional layers, pooling layers, and recurrent layers. Various types of functions may be applied by a layer, including linear combinations, convolutional kernels, activation functions, pooling, and so forth. The parameters of a layer's function are used to determine output activations for a layer from the layer's activation inputs and are typically modified during the model training process. The parameters describing the contribution of a particular portion of a prior layer is typically termed a weight. For example, in some layers, the function is a multiplication of each input with a respective weight to determine the activations for that layer. For a neural network, the parameters for the model as a whole thus may include the parameters for each of the individual layers and in large-scale networks can include hundreds of thousands, millions, or more of different parameters.

As one example for training a neural network, the cost function is evaluated at the output layer 1030. To determine modifications of the parameters for each layer, the parameters of each prior layer may be evaluated to determine respective modifications. In one example, the cost function (or "error") is backpropagated such that the parameters are evaluated by the optimization algorithm for each layer in sequence, until the input layer 1010 is reached.

Example Devices

Figure 11:
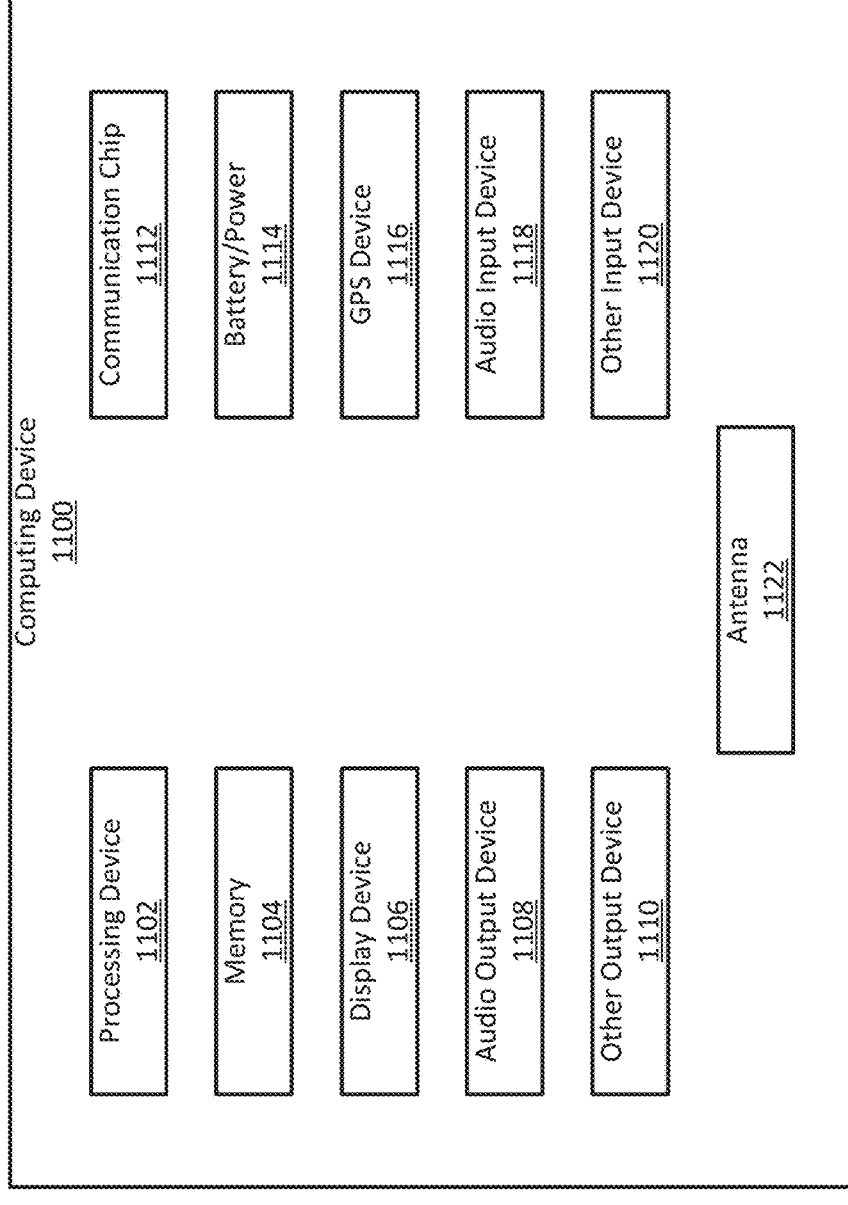
FIG. 11 is a block diagram of an example computing device that may include one or more components used for training, analyzing, or implementing a computer model in accordance with any of the embodiments disclosed herein.

FIG. 11 is a block diagram of an example computing device 1100 that may include one or more components used for training, analyzing, or implementing a computer model in accordance with any of the embodiments disclosed herein. For example, the computing device 1100 may include a training module for training a computer model and may include a trained computer model for executing functions of the computing device 1100, and in some circumstances may include specialized hardware and/or software for executing the computer model.

A number of components are illustrated in FIG. 11 as included in the computing device 1100, but any one or more of these components may be omitted or duplicated, as suitable for the application. In some embodiments, some or all of the components included in the computing device 1100 may be attached to one or more motherboards. In some embodiments, some or all of these components are fabricated onto a single system-on-a-chip (SoC) die.

Additionally, in various embodiments, the computing device 1100 may not include one or more of the components illustrated in FIG. 11, but the computing device 1100 may include interface circuitry for coupling to the one or more components. For example, the computing device 1100 may not include a display device 1106, but may include display device interface circuitry (e.g., a connector and driver circuitry) to which a display device 1106 may be coupled. In another set of examples, the computing device 1100 may not include an audio input device 1124 or an audio output device 1108 but may include audio input or output device interface circuitry (e.g., connectors and supporting circuitry) to which an audio input device 1124 or audio output device 1108 may be coupled.

The computing device 1100 may include a processing device 1102 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1100 may include a memory 1104, which may itself include one or more memory devices such as volatile memory (e.g., dynamic random-access memory (DRAM)), nonvolatile memory (e.g., read-only memory (ROM)), flash memory, solid state memory, and/or a hard drive. The memory 1104 may include instructions executable by the processing device for performing methods and functions as discussed herein. Such instructions may be instantiated in various types of memory, which may include non-volatile memory and as instructions stored on one or more non-transitory mediums. In some embodiments, the memory 1104 may include memory that shares a die with the processing device 1102. This memory may be used as cache memory and may include embedded dynamic random-access memory (eDRAM) or spin transfer torque magnetic random-access memory (STT-MRAM).

In some embodiments, the computing device 1100 may include a communication chip 1112 (e.g., one or more communication chips). For example, the communication chip 1112 may be configured for managing wireless communications for the transfer of data to and from the computing device 1100. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1112 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1112 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1112 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1112 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1112 may operate in accordance with other wireless protocols in other embodiments. The computing device 1100 may include an antenna 1122 to facilitate wireless communications and/or to receive other wireless communications (such as AM or FM radio transmissions).

In some embodiments, the communication chip 1112 may manage wired communications, such as electrical, optical, or any other suitable communication protocols (e.g., the Ethernet). As noted above, the communication chip 1112 may include multiple communication chips. For instance, a first communication chip 1112 may be dedicated to shorter-range wireless communications such as Wi-Fi or Bluetooth, and a second communication chip 1112 may be dedicated to longer-range wireless communications such as global positioning system (GPS), EDGE, GPRS, CDMA, WiMAX, LTE, EV-DO, or others. In some embodiments, a first communication chip 1112 may be dedicated to wireless communications, and a second communication chip 1112 may be dedicated to wired communications.

The computing device 1100 may include battery/power circuitry 1114. The battery/power circuitry 1114 may include one or more energy storage devices (e.g., batteries or capacitors) and/or circuitry for coupling components of the computing device 1100 to an energy source separate from the computing device 1100 (e.g., AC line power).

The computing device 1100 may include a display device 1106 (or corresponding interface circuitry, as discussed above). The display device 1106 may include any visual indicators, such as a heads-up display, a computer monitor, a projector, a touchscreen display, a liquid crystal display (LCD), a light-emitting diode display, or a flat panel display, for example.

The computing device 1100 may include an audio output device 1108 (or corresponding interface circuitry, as discussed above). The audio output device 1108 may include any device that generates an audible indicator, such as speakers, headsets, or earbuds, for example.

The computing device 1100 may include an audio input device 1124 (or corresponding interface circuitry, as discussed above). The audio input device 1124 may include any device that generates a signal representative of a sound, such as microphones, microphone arrays, or digital instruments (e.g., instruments having a musical instrument digital interface (MIDI) output).

The computing device 1100 may include a GPS device 1118 (or corresponding interface circuitry, as discussed above). The GPS device 1118 may be in communication with a satellite-based system and may receive a location of the computing device 1100, as known in the art.

The computing device 1100 may include an other output device 1110 (or corresponding interface circuitry, as discussed above). Examples of the other output device 1110 may include an audio codec, a video codec, a printer, a wired or wireless transmitter for providing information to other devices, or an additional storage device.

The computing device 1100 may include an other input device 1120 (or corresponding interface circuitry, as discussed above). Examples of the other input device 1120 may include an accelerometer, a gyroscope, a compass, an image capture device, a keyboard, a cursor control device such as a mouse, a stylus, a touch pad, a bar code reader, a Quick Response (QR) code reader, any sensor, or a radio frequency identification (RFID) reader.

The computing device 1100 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1100 may be any other electronic device that processes data.

SELECT EXAMPLES

The following paragraphs provide various examples of the embodiments disclosed herein.

Example 1 provides for a circuit for implementing a multiply-and-accumulate function, including a set of pseudo-multiplication circuits, each pseudo-multiplication circuit configured to receive a multiplicand (e.g., an activation) and a multiplier (e.g., a weight) and generate an output by multiplying the multiplicand by the multiplier with imperfect two's-complement arithmetic; and an accumulation circuit coupled to the set of pseudo-multiplication circuits and configured to accumulate the output of the set of pseudo-multiplication circuits and a value to perfect the two's complement arithmetic of the set of pseudo-multiplication circuits.

Example 2 provides for the circuit of example 1, wherein the value added to perfect the two's complement arithmetic is a bias parameter.

Example 3 provides for the circuit of example 2, wherein the bias parameter is configurable.

Example 4 provides for any of the circuits of examples 1-3, wherein the value added to perfect the two's complement arithmetic is based on a number of negative multipliers received by the set of pseudo-multiplication circuits.

Example 5 provides for any of the circuits of examples 1-4, wherein the circuit further includes an adder circuit that is configured to add the value to perfect the two's complement arithmetic.

Example 6 provides for any of the circuits of examples 1-5, wherein the multiplicand is an unsigned integer.

Example 7 provides for any of the circuits of example 1-6, wherein the multiplier is a power of two.

Example 8 provides for any of the circuits of example 1-7, wherein the set of pseudo-multiplication circuits is configured to perform the multiplication with a bitshift operation.

Example 9 provides for the circuit of example 8, wherein the pseudo-multiplication circuit is configured to perform the multiplication with an initial shift to a maximum or minimum weight range before applying the bitshift operation relative to the initial shift.

Example 10 provides for any of the circuits of examples 8-9, wherein the multiplier is encoded to include a magnitude describing a number of shifts for the bitshift operation.

Example 11 provides for any of the circuits of examples 1-10, wherein the pseudo-multiplication circuit includes: a first portion configured to multiply a magnitude of the multiplier with the multiplicand; and a second portion, coupled to the first portion, configured to receive the output of the first portion and invert the result of the first portion when the multiplier is negative; wherein the output of the second portion is the output of the pseudo-multiplication circuit.

Example 12 provides for the circuit of any of examples 1-11, wherein the multiplier is encoded as a magnitude, a negative bit, and a zero bit.

Example 13 provides for a circuit for implementing a convolutional layer of a neural network, the convolutional layer applying a set of channel weights to a set of input activations to generate a set of layer outputs, including: a channel selector circuit configured to select a subset of the set of channel weights as current channel weights for each clock cycle of a plurality of clock cycles; a set of convolutional blocks configured to receive the current channel weights and apply the current channel weights to a set of input activations and generate a current channel output for the current channel weights; and a channel buffer configured to store the current channel output as a subset of the set of layer outputs and output the set of layer outputs after the plurality of clock cycles.

Example 14 provides for the circuit of example 13 wherein a number of convolutional blocks in the set of convolutional blocks is less than a number of channel weights in the set of channel weights.

Example 15 provides for any of the circuits of example 13-14 wherein the number of convolutional blocks is substantially equal to the number of channel weights divided by the plurality of clock cycles.

Example 16 provides for any of the circuits of examples 13-15, wherein the set of input activations is constant during the plurality of clock cycles.

Example 17 provides for any of the circuits of examples 13-16, wherein the set of input activations is generated by one or more previous layers of the neural network.

Example 18 provides for the circuit of example 17, wherein the one or more previous layers includes a dimensional reduction layer.

Example 19 provides for the circuit of example 18, wherein a number of clock cycles in the plurality of clock cycles is based on the dimensional reduction of the dimensional reduction layer.

Example 20 provides for the circuit of any of examples 17-19, wherein the one or more previous layers includes at least one layer that generates an output for each clock cycle of the plurality of clock cycles.

Example 21 provides for the circuit of any of examples 17-20, wherein the one or more previous layers includes at least one layer that receives an input that varies each clock cycle of the plurality of clock cycles.

Example 22 provides for the circuit of example 13-21, wherein one or more of the set of convolutional blocks includes the circuit of any of examples 1-12.

Example 23 provides for a method for implementing parameters for a convolutional layer in a hardware accelerator, including: identifying parameters of a convolutional layer of a neural network, the parameters including a set of weights, and a bias to be added to the accumulated result of the set of weights multiplied by a respective set of inputs; modifying the parameters of the convolutional layer based on characteristics of one or more circuits on which the convolutional layer will be executed by: increasing the bias based on a number of the set of weights having a negative value; or encoding the set of weights to represent a magnitude of the weights relative to a maximum multiplication performable by the one or more circuits.

Example 24 provides for the method of example 23, further including modifying the parameters by increasing the bias and encoding the set of weights.

Example 25 provides for any of the methods of examples 23-24, wherein the bias is increased and further comprising: providing the set of weights and increased modified bias for a set of pseudo-multiplication circuits configured to: multiply each of the set of weights by a respective input with imperfect two's complement arithmetic, accumulate the result of the multiplication operations, and add the modified bias.

Example 26 provides for any of the methods of examples 23-25, wherein the weights are encoded and further comprising: providing the set of encoded weights to a set of multiplication circuits each configured to: receive an input; receive a respective encoded weight from the set of encoded weights apply the maximum multiplication to the input; and apply the respective encoded weight after the maximum multiplication is applied.

Example 27 provides for any of the methods of examples 23-26, further including: identifying one or more dimensional reduction layers in the one or more circuits that reduce the dimensionality of an input by a reduction factor; determining a number of convolutional blocks for the circuitry by dividing a number of channels for the convolutional layer by the reduction factor; provisioning the number of convolutional blocks for the one or more circuits to apply a subset of the set of weights on the number of convolutional blocks on each clock cycle, wherein the subset of the set of weights changing each clock cycle of a plurality of clock cycles.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

What is claimed is:

1. A circuit for implementing a multiply-and-accumulate function of a neural network, the circuit comprising:
  a plurality of pseudo-multiplication circuits configured to compute multiplication products of activations and weights of a convolutional layer of the neural network, a pseudo-multiplication circuit configured to perform a multiplication for the convolutional layer by:
    receiving an activation of the convolution layer and an encoded weight, the encoded weight generated from a weight of the convolutional layer,
    performing a first shift operation by shifting the activation by a predetermined number of bits, and
    performing a second shift operation by shifting a result of the first shift operation based on the encoded weight;
  an accumulation circuit coupled to the plurality of pseudo-multiplication circuits and configured to accumulate outputs of the plurality of pseudo-multiplication circuits to generate an accumulation output; and
  an adder circuit coupled to the accumulation circuit and configured to add a value to the accumulation output.

2. The circuit of claim 1, wherein the value added to the accumulation output is a bias parameter.

3. The circuit of claim 1, wherein the value added to the accumulation output is based on a number of negative weights of the convolutional layer.

4. The circuit of claim 1, wherein the first shift operation is a left shift operation.

5. The circuit of claim 1, wherein the second shift operation is a right shift operation.

6. The circuit of claim 1, wherein the encoded weight includes a magnitude indicating a number of bit shifts for the second shift operation.

7. The circuit of claim 1, wherein the pseudo-multiplication circuit is configured to perform the multiplication further by:
  inverting a result of the second shift operation when the weight is negative.

8. The circuit of claim 7, wherein the pseudo-multiplication circuit is to invert the result of the second shift operation by applying an XOR operation on the result of the second shift operation.

9. The circuit of claim 8, wherein the pseudo-multiplication circuit comprises a multiplexer, the multiplexer to select a value between zero and a result of the XOR operation, wherein an output of the multiplexer is an output of the pseudo-multiplication circuit.

10. The circuit of claim 1, wherein another one of the plurality of pseudo-multiplication circuits is configured to perform a shift operation on another activation of the convolutional layer by the predetermined number of bits.

11. The circuit of claim 6, wherein the encoded weight further includes a field indicating a sign of the weight or a field indicating whether the weight is zero.

12. An apparatus for executing a convolutional layer of a neural network, the apparatus comprising:
  one or more pseudo-multiplication units configured to compute multiplication products of activations and weights of the convolutional layer, a pseudo-multiplication unit configured to perform a multiplication for the convolutional layer by:
    receiving an activation of the convolution layer and an encoded weight, the encoded weight generated from a weight of the convolutional layer,
    performing a first shift operation by shifting the activation by a predetermined number of bits, and
    performing a second shift operation by shifting a result of the first shift operation based on the encoded weight; and
  an accumulation unit coupled to the one or more pseudo-multiplication units and configured to accumulate outputs of the one or more pseudo-multiplication units to generate an accumulation output.

13. The apparatus of claim 12, wherein the first shift operation is a left shift operation.

14. The apparatus of claim 12, wherein the second shift operation is a right shift operation.

15. The apparatus of claim 12, wherein the encoded weight includes a magnitude indicating a number of bit shifts for the second shift operation.

16. The apparatus of claim 15, wherein the encoded weight further includes a field indicating a sign of the weight or a field indicating whether the weight is zero.

17. The apparatus of claim 12, wherein the pseudo-multiplication unit is configured to perform the multiplication further by:
  inverting a result of the second shift operation when the weight is negative.

18. The apparatus of claim 17, wherein the pseudo-multiplication unit is to invert the result of the second shift operation by applying an XOR operation on the result of the second shift operation.

19. The apparatus of claim 18, wherein the pseudo-multiplication unit comprises a multiplexer, the multiplexer to select a value between zero and a result of the XOR operation, wherein an output of the multiplexer is an output of the pseudo-multiplication unit.

20. The apparatus of claim 12, wherein another one of the plurality of pseudo-multiplication units is configured to perform a shift operation on another activation of the convolutional layer by the predetermined number of bits.

21. An apparatus for executing multiplications of activations and weights for a convolutional layer of a neural network, the apparatus comprising:

a first shift operator to receive an activation of the convolutional layer and to shift the activation by a predetermined number of bits;

a second shift operator to receive an encoded weight generated from a weight of the convolutional layer and to shift an output of the first shift operator based on the encoded weight;

an XOR gate to invert a sign of an output of the second shift operator; and a multiplexer to select a value between an output of the XOR gate and zero.

22. The apparatus of claim 21, wherein the first shift operator is configured to perform left shift, and the second shift operator is configured to perform right shift.

23. The apparatus of claim 21, wherein the encoded weight includes a field indicating a number of bit shifts, wherein the second shift operator is to shift the output of the first shift operator based on the field of the encoded weight.

24. The apparatus of claim 21, wherein the encoded weight includes a field indicating a sign of the weight, wherein the XOR gate to invert the sign of the output of the second shift operator based on the field of the encoded weight.

25. The apparatus of claim 21, wherein the encoded weight includes a field indicating whether the weight is zero, wherein the multiplexer is to select the value based on the field of the encoded weight.

\* \* \* \* \*